US012555305B2

(12) United States Patent
Lee et al.

(10) Patent No.: US 12,555,305 B2
(45) Date of Patent: Feb. 17, 2026

(54) SYSTEMS AND METHODS FOR GENERATING AND/OR USING 3-DIMENSIONAL INFORMATION WITH CAMERA ARRAYS

(71) Applicant: Visionary Machines Pty Ltd, Hornsby (AU)

(72) Inventors: Samson Lee, Hornsby (AU); Rhys Andrew Newman, Hornsby (AU)

(73) Assignee: Visionary Machines Pty Ltd, Hornsby (AU)

( * ) Notice: Subject to any disclaimer, the term of this patent is extended or adjusted under 35 U.S.C. 154(b) by 154 days.

(21) Appl. No.: 17/773,700

(22) PCT Filed: Oct. 30, 2020

(86) PCT No.: PCT/AU2020/051189
§ 371 (c)(1),
(2) Date: May 2, 2022

(87) PCT Pub. No.: WO2021/081603
PCT Pub. Date: May 6, 2021

(65) Prior Publication Data
US 2022/0383585 A1    Dec. 1, 2022

Related U.S. Application Data

(60) Provisional application No. 62/929,336, filed on Nov. 1, 2019.

(30) Foreign Application Priority Data

Nov. 1, 2019    (AU) .................................. 2019904127

(51) Int. Cl.
*G06T 15/08*    (2011.01)
*G06T 7/70*    (2017.01)
*G06T 11/00*    (2006.01)

(52) U.S. Cl.
CPC ................ *G06T 15/08* (2013.01); *G06T 7/70* (2017.01); *G06T 11/006* (2013.01); *G06T 11/008* (2013.01)

(58) Field of Classification Search
None
See application file for complete search history.

(56) References Cited

U.S. PATENT DOCUMENTS 8,854,282 B1 * 10/2014 Wong ........................ G06F 3/14
345/7
8,922,636 B1    12/2014 Belden et al.
(Continued)

FOREIGN PATENT DOCUMENTS

JP    2010128742 A *    6/2010
JP    2011149952 A    8/2011
(Continued)

OTHER PUBLICATIONS

International-type Search for Provisional Patent Application (AU2019904127), prepared by IP Australia; Jan. 1, 2020.
(Continued)

*Primary Examiner* — Aaron M Richer
(74) *Attorney, Agent, or Firm* — Kilpatrick Townsend & Stockton LLP

(57) ABSTRACT

The present disclosure is directed to systems and/or methods that may be used for determining scene information (for example, 3D scene information) using data obtained at least in part from a camera array. Certain embodiments may be used to create scene measurements of depth (and the probability of accuracy of that depth) using an array of cameras. One purpose of certain embodiments may be to determine the depths of elements of a scene, where the scene is observed from a camera array that may be moving through the scene. Certain embodiments may be used to determine open navigable space and to calculate the trajectories of
(Continued)

objects that may be occupying portions of that space. In certain embodiments, the scene information may be used to generate a virtual space of voxels where the method then determines the occupancy of the voxel space by comparing a variety of measurements, including spectral response.

20 Claims, 14 Drawing Sheets

(56) References Cited

U.S. PATENT DOCUMENTS

| | | | |
|---|---|---|---|
| 2001/0005204 A1 | 6/2001 | Matsumoto et al. | |
| 2014/0043331 A1* | 2/2014 | Makinen | G06T 17/005 |
| | | | 345/424 |
| 2014/0092217 A1 | 4/2014 | Tanner | |
| 2014/0205270 A1 | 7/2014 | Kelly et al. | |
| 2014/0321712 A1 | 10/2014 | Ciurea et al. | |
| 2015/0116597 A1 | 4/2015 | Chandraker et al. | |
| 2016/0353089 A1* | 12/2016 | Gallup | H04N 13/194 |
| 2017/0208292 A1* | 7/2017 | Smits | G03H 1/0005 |
| 2018/0089888 A1 | 3/2018 | Ondruska et al. | |
| 2018/0180733 A1 | 6/2018 | Smits | |
| 2018/0365889 A1* | 12/2018 | Bisson | G06T 17/00 |
| 2019/0035148 A1* | 1/2019 | Owechko | G06T 17/20 |
| 2019/0188902 A1* | 6/2019 | Doig | G06T 15/06 |
| 2020/0184656 A1* | 6/2020 | Murphy-Chutorian | |
| | | | G06T 7/246 |
| 2020/0242832 A1* | 7/2020 | Yamamoto | G06T 15/20 |

FOREIGN PATENT DOCUMENTS

| | | | | |
|---|---|---|---|---|
| WO | WO-2013009160 A2 * | 1/2013 | | G06F 17/18 |
| WO | 2019116942 A1 | 6/2019 | | |

OTHER PUBLICATIONS

EP20881445.9 , "Extended European Search Report", Oct. 2, 2023, 13 pages.
Ondruska et al., "MobileFusion: Real-Time Volumetric Surface Reconstruction and Dense Tracking on Mobile Phones", Institute of Electrical and Electronics Engineers Transactions on Visualization and Computer Graphics, vol. 21, No. 11, Nov. 2015, 8 pages.
PCT/AU2020/051189 , "International Preliminary Report on Patentability", May 12, 2022, 7 pages.
PCT/AU2020/051189 , "International Search Report and Written Opinion", Jan. 15, 2021, 12 pages.
EP20881445.9 , "Office Action", Jul. 22, 2024, 7 pages.

* cited by examiner

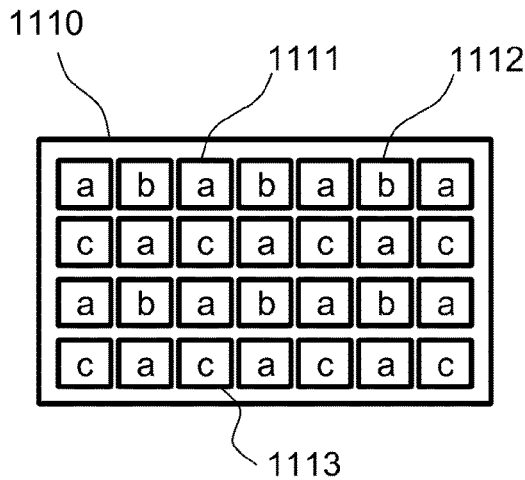
Fig. 11A
[Illustration of Bayer Filter]
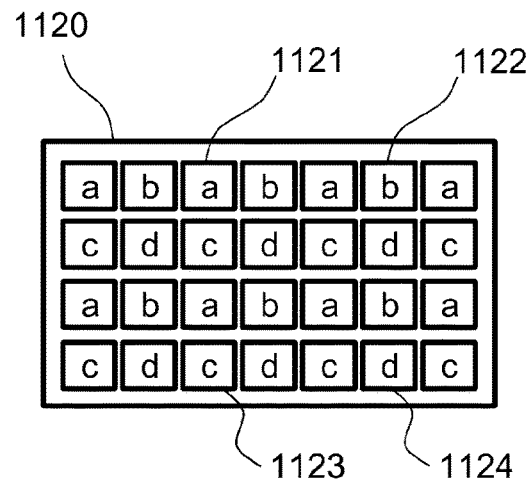
Fig. 11B
[Illustration of an alternative Filter Array]
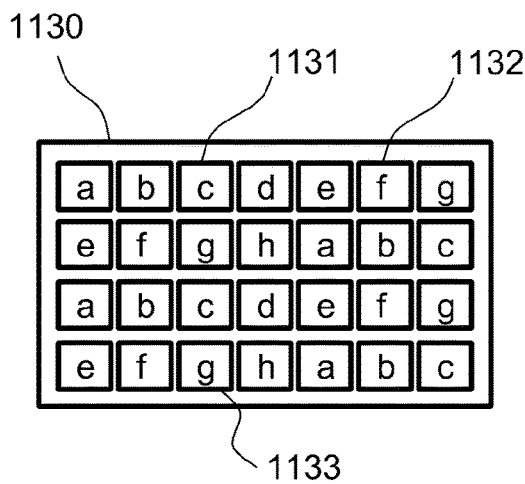
Fig. 11C
[Illustration of a eight-way Filter Array]
FIG. 11

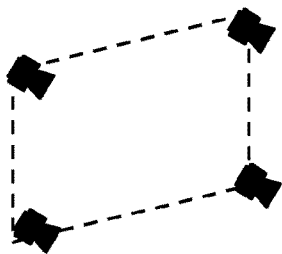
FIG 12A
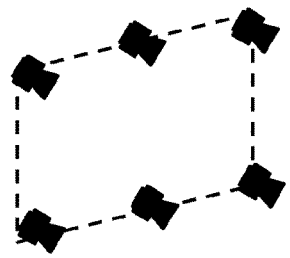
FIG 12B
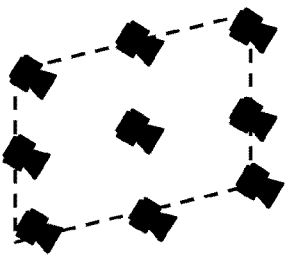
FIG 12C
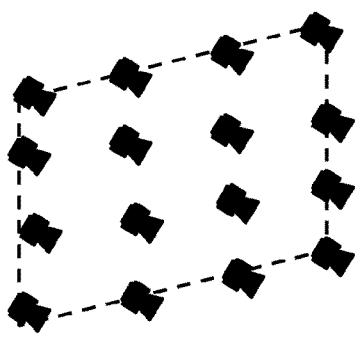
FIG 12D
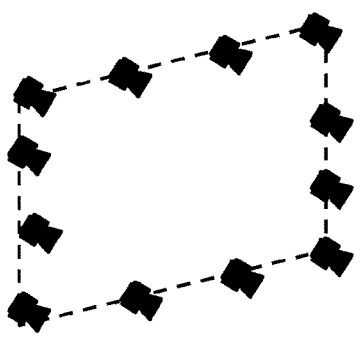
FIG 12E
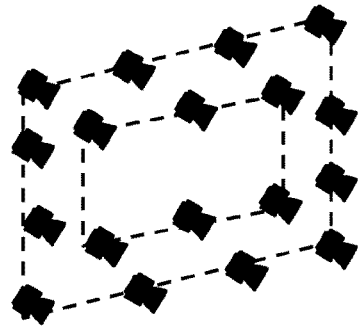
FIG 12F
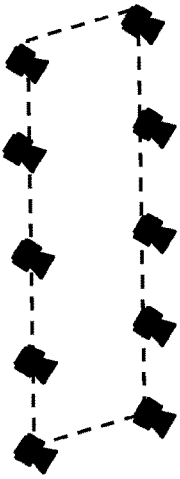
FIG 12G
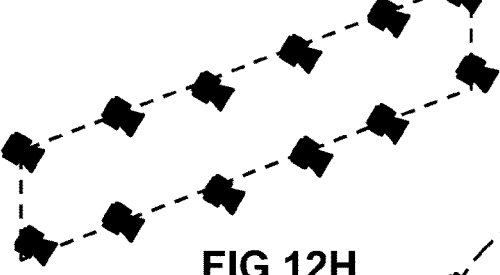
FIG 12H
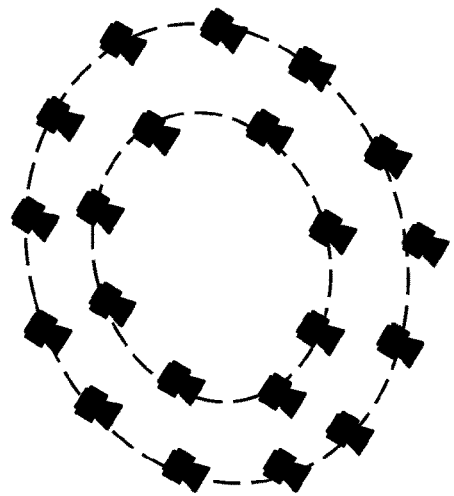
FIG 12I
FIG 12J

FIG. 13A
FIG. 13B
FIG. 13C
FIG 13

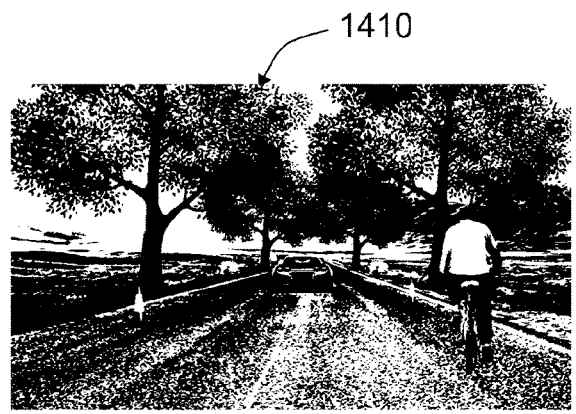
FIG. 14A
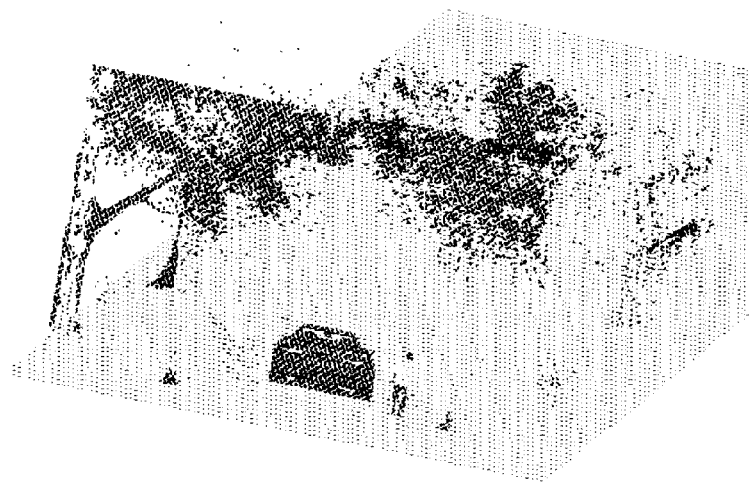
FIG. 14B
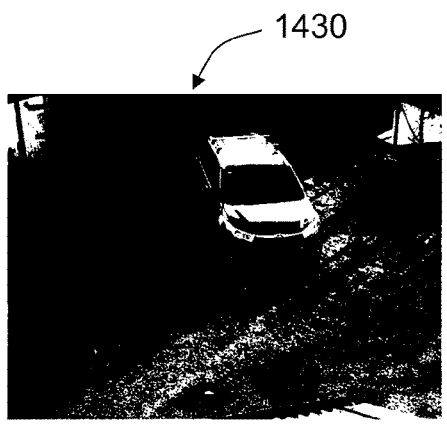
FIG. 14C
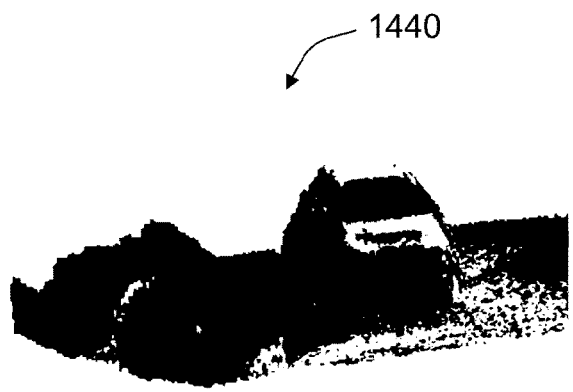
FIG. 14D
FIG 14

SYSTEMS AND METHODS FOR GENERATING AND/OR USING 3-DIMENSIONAL INFORMATION WITH CAMERA ARRAYS

RELATED APPLICATIONS

This application is a U.S. National Phase of International Application No. PCT/AU2020/051189, filed Oct. 30, 2020, claiming priority to U.S. Provisional Application Ser. No. 62/929,336, entitled, Systems and Methods for Generating and/or Using 3-Dimensional Information with Camera Arrays, filed on 1 Nov. 2019; and to Australian Provisional Application No. 2019904127, entitled, Systems and Methods for Generating and/or Using 3-Dimensional Information with Camera Arrays, filed on 1 Nov. 2019. Each of these applications are herein incorporated by reference in their entirety.

TECHNICAL FIELD

The present disclosure relates generally to devices, systems and/or methods that may be used for determining scene information using data obtained at least in part from a camera array. That scene information may be 3D information.

BACKGROUND

Computationally-tractable 3D scene information about the environment is useful for many applications including, for example, the safe autonomous driving of vehicles on conventional roads and highways.

One way of creating such 3D scene information is by using one or more lasers, potentially strobing to cover a 3D space, and measuring the time delay to receive the reflected laser pulses—such devices are commonly termed LiDAR. This approach has a number of drawbacks—it is difficult to achieve lateral accuracy at long range (angular resolution is fixed and therefore errors grow with distance), the laser pulses potentially interfere when there are many active lasers in an environment (a common case in traffic filled with LiDAR equipped vehicles), the returned pulses require reasonable reflectivity from the target surface in the response direction; and rain, dust and snow cause difficulties by cluttering the scene with potential multiple reflections and break the assumption that the light pulses will travel to a target and back in a straight line. Further, LiDAR does not capture the visual appearance (typically containing in the Red-Green-Blue (RGB) part of the visual electromagnetic spectrum) of the target surface, thereby limiting some processing and analysis.

Another alternative way to create 3D scene information is to use radar. However, radar is more limited in angular resolution than LiDAR, and reflections are more dependent on target surface characteristics—(metal reflects well but human bodies absorb radar).

Optical camera systems may be used, with appropriate processing, to generate 3D scene information. Binocular cameras, capturing pairs of images may be used to derive 3D scene information, in particular depth information, based on binocular disparity. Typically, binocular disparity methods match local regions in image pairs captured by cameras that have a known physical separation or baseline. From the disparity a depth for the matched region may be determined based on optical (the assumption that light travels in straight lines) and geometric principles. Binocular disparity methods are prone to error in plain regions where there is little or no texture that enables accurate matching between the two separate views. Binocular disparity also suffers from ambiguity around some objects where parts of the scene are occluded from one or both cameras.

Optical camera systems, using multiple cameras in concert to view a scene from different positions are known in the art—these systems are often simply referred to as camera arrays. These arrays capture a set of 2D images from different directions/positions for the whole scene. Depth maps may be obtained using similar principles to the binocular camera, based on disparity of local regions matched between pairs of images from different cameras in the camera array. One implementation of a camera array system is the micro-lens array. This uses an array of small lenses set in a fixed grid positioned directly on top of an image sensor chip. This system is compact but the baseline between camera pairs is then necessarily constrained by the size and resolution of the micro-lens array, limiting the depth and angular (spatial) resolution accuracy.

The present disclosure is directed to overcome and/or ameliorate at least one or more of the disadvantages of the prior art, as will become apparent from the discussion herein. The present disclosure also provides other advantages and/or improvements as discussed herein.

SUMMARY OF THE DISCLOSURE

Certain embodiments of the present disclosure are directed at devices, systems and/or methods that are capable of generating a 3D representation of a scene. Certain embodiments are directed at devices, systems and/or methods that are configured to generate a 3D representation of a scene.

Certain embodiments are directed at devices, systems and/or methods that are capable of generating a 3D representation of a scene and repeating the process in order to generate a 3D video data stream of the scene. Certain embodiments are directed at devices, systems and/or methods that are configured to generate a 3D representation of a scene and repeating the process in order to generate a 3D video data stream of the scene.

Certain embodiments are directed at devices, systems and/or methods that are capable of generating a 3D representation of a scene or, by rapidly repeating the process in real time, a 3D video data stream of the unfolding scene. Certain embodiments are directed at devices, systems and/or methods that are configured to generate a 3D representation of a scene or, by rapidly repeating the process in real time, a 3D video data stream of the unfolding scene.

A camera array comprising a plurality of cameras is directed towards a scene and the information collected from the camera array is used at least in part to generate a model of the scene as a voxel space. spectral data from one or more cameras may be received by a processing engine. The processing engine determines the probability that the portion of the scene represented by the voxel is physically occupied by a surface. The probability of the voxel being physically occupied is based on the probability that the portion of the scene represented by the voxel contains a surface that is reflecting light towards the cameras in the array from that voxel. The determination of the probability that the portion of the scene represented by the voxel contains an observable surface is determined by evaluation of a portion of Spectra Data from the plurality of cameras in the camera array.

Certain embodiments are directed to devices, systems, and/or methods that address this problem by obtaining a sampling of the visual space from a plurality of cameras and presenting the resulting 3D video stream as a 3D point cloud stream.

Certain embodiments are directed to a system for generating three-dimensional video streams with accurate depth estimates using camera arrays comprising: at least one camera array consisting of multiple cameras (at least 4, 5, 6, 8, 10, 12, 14, 16, or more cameras) where each camera comprises a sensor sensitive to the electromagnetic spectrum and is mounted in an approximately fixed and known position in the array (i.e., relative to the other cameras); a mechanism that ensures that each camera in the Array takes its frame shot at the same time (or substantially the same time) as the other cameras in the Array; and an image processing system that takes the plurality images (or a substantial portion of the plurality of images) from the array and computes: a normalization that aligns each image (or a substantial portion of the images); a set of voxels that comprise the 3D scene (or a portion of the 3D scene; a voxel depth calculation that determines the probability of each voxel (or a substantial portion of the voxels) being occupied at a particular 3D position in space; and an output from the image processing system that produces a 3D depth map (or 3D point cloud) frame by frame for the scene that consists of colour values and a probability for each voxel (or a substantial portion of the voxels) being occupied at a particular position.

In a first aspect, certain embodiments of the present disclosure are directed to a system that is capable of producing a voxel space comprising: a camera array; a processing engine that is capable of: receiving spectral data collected from the camera array; using the collected spectral data at least in part to generate a voxel space by determining one or more probabilities that a portion of a scene is occupied by a surface; wherein the voxel space is representative of a physical space. In certain embodiments, the system and its components may "configured to" instead of "capable of" as used in this paragraph.

In a second aspect, certain embodiments of the present disclosure are directed to a system that is capable of producing a voxel space comprising: a camera array made up of a plurality of cameras; the plurality of cameras comprising two or more cameras that are capable of spectral data collection from two or more field of views of a scene; a processing engine that is capable of: receiving spectral data collected from the camera array; using the collected spectral data at least in part to generate the voxel space that comprises a plurality of voxels by determining for one or more voxels of the plurality of voxels one or more probabilities that a portion of the scene represented by the one or more voxels is occupied by a surface; aggregating the portion of the scene into a plurality of scenes to generate the voxel space; wherein the voxel space is representative of a physical space based at least in part spectral data collected from the two or more field of views.

In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components may "configured to" instead of "capable of" as used in this paragraph.

In a third aspect, certain embodiments of the present disclosure are directed to a system that is capable of producing a plurality of voxels comprising: a camera array made up of a plurality of cameras; the plurality of cameras comprising two or more cameras that are capable of spectral data collection from two or more field of views of a scene; a processing engine that is capable of: receiving spectral data collected from the camera array; using the collected spectral data at least in part to generate the plurality of voxels by determining for one or more voxels of the plurality of voxels one or more probabilities that a portion of the scene represented by the one or more voxels is occupied by a surface; aggregating the portion of the scene into a plurality of scenes to generate the plurality of voxels; wherein the plurality of voxels is representative of a physical space based at least in part spectral data collected from the two or more field of views.

In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components may "configured to" instead of "capable of" as used in this paragraph.

Certain embodiments are directed to a system that is capable of producing a voxel space comprising: a camera array made up of a plurality of cameras; the plurality of cameras comprising two or more cameras that are capable of spectral data collection from two or more field of views; a processing engine that is capable of: receiving spectral data from the camera array and using the spectral data at least in part to generate a plurality of voxels by determining for one or more voxels of the plurality of voxels one or more spectral signals including one or more transparency values and producing one or more spectral values; aggregating the one or more spectral values into a plurality of spectral signals to generate the voxel space; wherein the voxel space is representative of a physical space. In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components may "configured to" instead of "capable of" as used in this paragraph.

Certain embodiments are directed to a system that is capable of producing a plurality of voxels comprising: a camera array made up of a plurality of cameras; the plurality of cameras comprising two or more cameras that are capable of spectral data collection from two or more field of views; a processing engine that is capable of: receiving spectral data from the camera array and using the spectral data at least in part to generate the plurality of voxels by determining for one or more voxels of the plurality of voxels one or more spectral signals including one or more transparency values and producing one or more spectral values; aggregating the one or more spectral values into a plurality of spectral signals to generate the plurality of voxels; wherein the plurality of voxels is representative of a physical space. In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components may "configured to" instead of "capable of" as used in this paragraph.

Certain embodiments are directed to a system that is capable of producing a voxel space comprising: a camera array comprising a plurality of cameras that are capable of collecting spectral data from a field of view, wherein the field of view of the plurality of cameras overlaps at least in part; a processing device that is capable of receiving spectral data collected from the camera array, the processing device is capable of converting the collected spectral data into the voxel space that comprises a plurality of voxels, and the processing device is capable of determining for one or more voxels in the plurality of voxels a spectral signal including transparency; wherein the voxel space is representative of a physical space. In certain embodiments, the system and its components may "configured to" instead of "capable of" as used in this paragraph.

Certain embodiments are directed to a method for generating a voxel space of a scene that is representative of a physical space comprising: arranging a camera array made up of a plurality of cameras comprising two or more cameras, the two or more cameras of the camera array are configured to collect spectral data from one or more views of the physical space; using the plurality of cameras of the camera array to collect spectral data from the one or more views of the physical space, the collected spectral data being of two or more field of views of the physical space; transferring the collected spectral data from the camera array to a processing engine, generating the scene within the processing engine by using the collected spectral data at least in part to generate a plurality of voxels by determining for one or more voxels of the plurality of voxels one or more probabilities that a portion of the scene represented by the one or more voxels is occupied by a surface; and aggregating the plurality of voxels into the voxel space; wherein the voxel space of the scene is representative of a physical space based at least in part on spectral data collected from the two or more field of views. In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components used in the method may "configured to" instead of "capable of" as used in this paragraph.

Certain embodiments are directed to a system that is capable of generating a three-dimensional streaming voxel space that is representative of a physical space comprising: a camera array made up of a plurality of cameras; the plurality of cameras comprising two or more cameras that are capable of spectral data collection from two or more field of views of a scene, wherein at least one camera is mounted in a known position within the camera array; the camera array is configured such that at least a first camera collects at least a first set of spectral data and at least a second camera collects at least a second set of spectral data at substantially the same time; a processing engine that is capable of: receiving the at least first set of spectral data and the at least second set of spectral data from the camera array; performing a normalization that aligns the at least first set of spectral data and the at least second set of spectral data to produce at least one aligned set of spectral data; using the at least one aligned set of spectral data at least in part to generate at least one voxel space by determining for one or more voxels of the voxel space a probability that one or more voxels contains a surface; aggregating the at least one voxel space into a plurality of voxel spaces and using the plurality of voxels spaces to generate the three-dimensional streaming voxel space; wherein the three-dimensional streaming voxel space is a frame by frame three-dimensional representation of the physical space. In certain embodiments, the plurality of cameras comprising two or more cameras that are capable of spectral data collection from three or more field of views of a scene, from five or more field of views of a scene, or from ten or more field of views of a scene. In certain embodiments, the plurality of cameras comprising five or more cameras that are capable of spectral data collection, from five or more field of views of a scene, or from ten or more field of views of a scene. In certain embodiments, the system and its components may "configured to" instead of "capable of" as used in this paragraph.

This summary is not intended to be limiting as to the embodiments disclosed herein and other embodiments are disclosed in this specification. In addition, limitations of one embodiment may be combined with limitations of other embodiments to form additional embodiments.

BRIEF DESCRIPTION OF DRAWINGS

FIG. 11 is an illustration of exemplary Bayer filter arrangements, according to certain embodiments.

FIG. 12 is an illustration of exemplary camera array configurations, according to certain embodiments.

FIG. 13 shows a simulated image of a road scene, according to certain embodiments.

FIG. 14 shows a simulated image of a road scene, according to certain embodiments.

DETAILED DESCRIPTION

Figure 1:
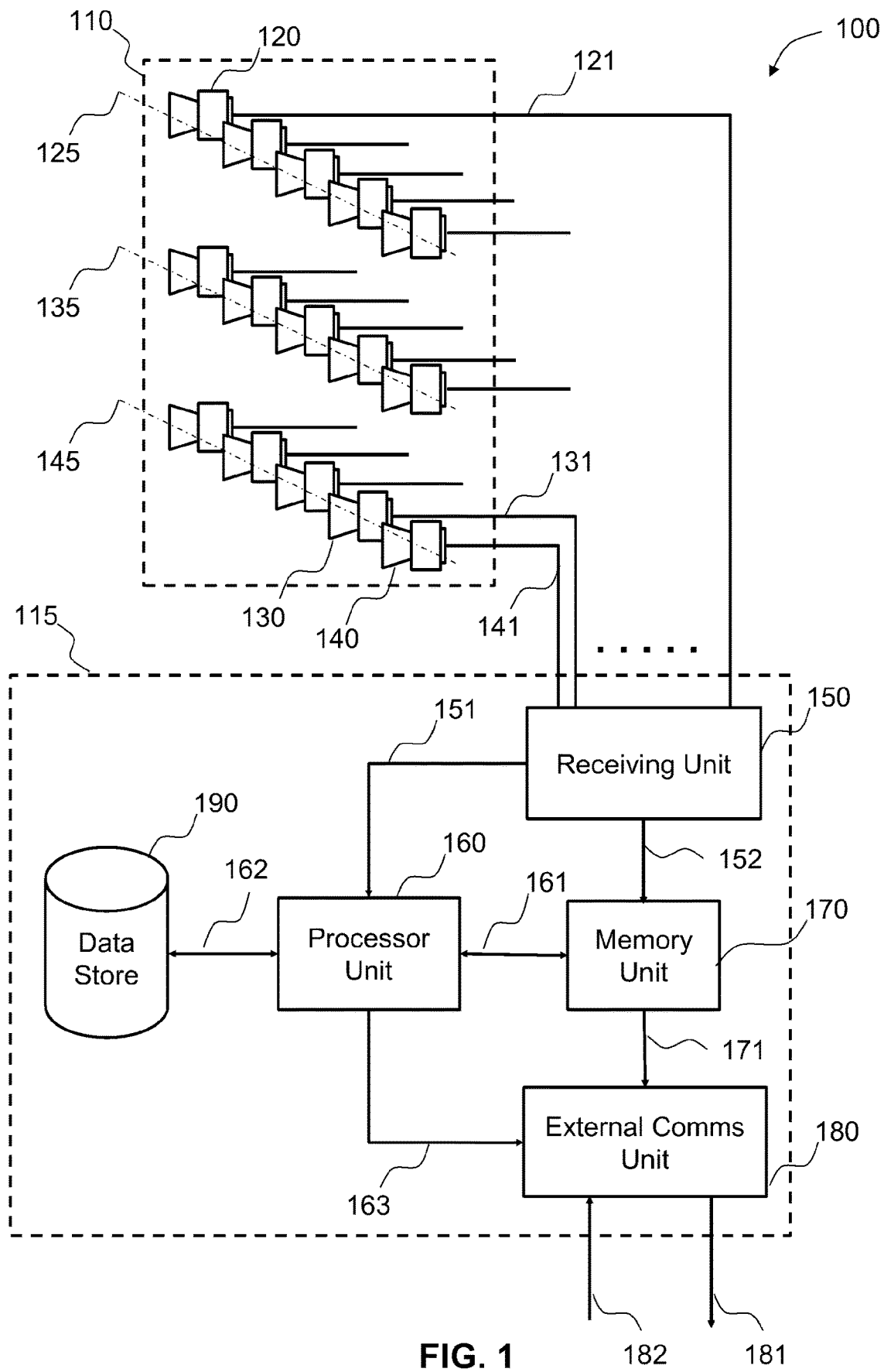
FIG. 1 is a top-level system diagram for creating a 3-dimensional representation of a scene, including a camera array and a processing engine, according to certain embodiments.

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

Certain embodiments of this disclosure may be useful in a number of areas. For example, one or more of the following non-limiting exemplary applications: off-road vehicle (e.g., cars, buses, motorcycles, trucks, tractors, forklifts, cranes, backhoes, bulldozers); road vehicles (e.g. cars, buses, motorcycles, trucks); rail based vehicles (e.g., locomotives); air based vehicles (e.g., airplanes, drones); individuals (e.g., miners, soldiers, war fighters, pilots), amphibious vehicles (e.g., boats, cars, buses); and watercraft (e.g., ships boats, hovercraft, submarines). In addition, the non-limiting exemplary applications may be operator driven, semi-autonomous and/or autonomous.

The term "scene" means a subset of the real world as perceived through (1) a field of view and the resolution of a camera and a camera imaging system associated with one or more cameras; or (2) a joint field of view and the resolution of a plurality of cameras and a plurality of camera imaging systems associated with one or more cameras. In certain embodiments, the camera may comprise 1, 2, 3, or 4 lenses. In certain embodiments, the camera may comprise at least 1, 2, 3, or 4 lenses. In certain embodiments, the camera may comprise between 1 to 4 lenses. In certain embodiments, the camera imaging system may comprise at least 2, 3, 4, 5, 10, 15, 20, 25, 30, 35 or 40 lenses. In certain embodiments, the camera lenses may comprise between 2 to 4, 3 to 4, 4 to 6, 5 to 10, 7-10, 11 to 20, 31 to 30, or 31 to 50 lenses. In certain embodiments, the camera imaging system may comprise least 4, 5, 10, 15, or 20 cameras. In certain embodiments, the camera lenses may comprise at between 4 to 6, 5 to 10, 7-10, 11 to 20, 31 to 30, or 31 to 50 lenses. In certain embodiments, the camera lenses may comprise at between 100-200, 200-1000, 10000 or more lenses.

The term "3D space" means a geometrical representation in which the location of one or more points in the geometry are defined at least in part by three parameters that indicate distance from an origin reference to the one or more points, for example, in three directions from the origin where the directions may be substantially perpendicular, or as an alternative example using a spherical coordinate system consisting of a radial distance, a polar angle, and an azimuthal angle.

The term "3D scene information" means information about a 3D space that represents a scene at a relatively static time period, where information about one or more points in the 3D space include the location of a point in the scene together with spectral information regarding the appearance of the point from the viewpoint of the camera imaging system or systems, optionally together with a set of metadata about the point, where the metadata may include one or more of the following: the spectral emission of the point, the texture of the point, spectral data from a region about the point, the type of object wholly or partially present at the point and potentially other data.

The term "voxel space" means a 3D space in which the space is at least partially dissected into a plurality of 3D elements ("voxels"). In certain embodiments, the voxels are non-overlapping. In certain embodiments, the voxels may be overlapping. In certain embodiments, at least 60%, 70%, 80%, 90%, or 95% of the voxels are non-overlapping. In certain embodiments, no more than 5%, 10%, 15%, 20%, 25% or 30% of the voxels may be overlapping. The shape of the voxels may be defined, for example, the shape of the voxels may be cuboids, cubes, spheres, ovoids or combinations thereof. In certain embodiments, the voxel space may be made up of combinations of different voxel shapes, for example, cuboids, cubes, spheres, or ovoids. In certain embodiments, the voxels may be arranged in planes that are perpendicular, or substantially perpendicular, to the axis of the camera array and the voxel space may extend vertically and/or horizontally to include that portion of the 3D scene that is simultaneously substantially in the field of view of cameras in the array. In certain embodiments, the voxels may be arranged such that there may be gaps between two or more voxels (in other words, holes in 3D). In certain embodiments, the voxels may be arranged to create an overlap between two or more voxels.

The term "neighbouring voxels" means one or more voxels in the proximity to a particular voxel. For example, voxels immediately adjacent to the particular voxel, or in the vicinity of the particular voxel, or no further than a number of intervening voxels (e.g. 1, 2, 3, 4, 10, 20, or 100 voxels) distant from the particular voxel.

The term "camera" means a device that focus incoming electromagnetic signals in a portion of the electromagnetic spectrum onto the device. For example, the camera may comprise an image sensor, a filter array and a sensor element (or a plurality of sensor elements) that focus incoming electromagnetic signals in a portion of the electromagnetic spectrum onto the image sensor through the filter array. As an alternative example, the camera may comprise an image sensor and a lens element (or a plurality of lens elements) that focus incoming electromagnetic signals onto the image sensor. The lens element, for example, may be an optical lens, a diffractive grating lens or combinations thereof.

The term "sensor element" means a receptor within, associated with, or in communication with an image sensor of a camera that measures the intensity of the incoming electromagnetic spectrum arriving on its surface.

The term "image sensor" means a plurality of sensor elements arranged spatially. In certain embodiments, the plurality of sensor elements may be arranged in a planar, or substantially planar, relationship. In certain embodiments, the plurality of sensor elements may be arranged regularly pattern in a (for example, the sensor elements may be substantially equally spaced apart). In certain embodiments, the plurality of sensor elements may be arranged in an irregularly pattern (for example, the sensor elements may be spaced apart at different distances). In certain embodiments, the plurality of sensor elements may be arranged regularly pattern and an irregularly pattern (for example, at least two sensor elements may be substantially equally spaced apart and at least two sensor elements may be spaced apart at different distances substantially equally spaced apart). In certain embodiments, the sensor elements may be arranged in at least 1, 2, 3, or 4 planar, or substantially planar, relationships. Other spatially relationships of the sensor elements are contemplated.

The term "filter array" means a filter, or a set of filters, that are positioned in proximity to the sensor elements in an image sensor such that the filter, or the set of filters, passes a portion of the electromagnetic spectrum reaching it and thereby the sensor element responds to and measures the intensity of that part of the spectrum. An example of a filter array is a Bayer filter, that filters light in a RG-GB pattern (for example, arranged in a simple 2×2 square group of neighbouring senor elements).

The term "voxel projection" means a mapping between at least one voxel and at least one 2D region within an image sensor, computed by projecting virtual light rays between a voxel and the region, using optical characteristics of the camera lens or lenses, together with the distance and/or orientation of the voxel relative to the camera. In certain embodiments, the mapping may be one-to-one. In certain embodiments at least one voxel may not be a one-to one mapping.

The term "voxel projection spectral data" means the spectral data that may be measured by sensor elements within the region of an image sensor onto which at least part of a voxel is projected given the 3D geometry of the voxel's position relative to the sensor.

The term "spectral data similarity measure" means a method, or methods, to compare spectral data between a plurality of sources by associating a quantitative measure of the similarity of the spectral data between at least a portion of the sources. Examples of such measures include one or more of the following: the standard deviation of Euclidean distances from the mean; the median or the geometric median; sum of distances from the mean; median or geometric median; normalised correlation, differences in Fourier spectrum characteristics; sum of absolute differences; sum of squared differences; normalised cross-correlation and a other suitable metrics.

The term "surface" means an element in a scene that emits and/or reflects electromagnetic signals in at least one portion of a spectral band and where at least a portion of such signals travel across at least a portion of the scene. In certain embodiments, the at least a portion of such signals may travel unimpeded (and in a straight line) across at least a portion of the scene.

The term "spectral data" or "spectral response" means the signal's measured intensity produced from a selected plurality of sensor elements in an image sensor where the sensor elements measure incoming intensity in a plurality of spectral bands. One example of spectral data is a colour. Colour may be represented by the strength of electromagnetic signals in red, green and blue bands of visible light in the electromagnetic spectrum where filters are arranged in a Bayer pattern of RG-GB or similar. Alternative systems may also use non-visible bands in the electromagnetic spectrum or alternative bands in the visible spectrum. For example, some filters may be in the ultraviolet band or in the infra-red band. In certain embodiments, the spectral bands may comprise one or more of the following: visible, ultraviolet, and infra-red. Further the spectral data may mean the collected output of a pre-determined number of sensor elements, capable (or configured to) of responding to at least one electromagnetic spectral band and may include those that sample multiple bands substantially simultaneously, and that are physically in proximity to one another and such spectral data may be used as a spectral signature, that may provide a basis for determining similarity.

The term "relatively static time period" means a period of time in which the majority of the objects in a scene do not move very much relative to the camera and their distance to the camera. As used with respect to this term, the period of time may be about 0.0001 seconds, 0.01, 0.05, 0.1 seconds, 0.2 seconds, 1 second, or 10 seconds in certain embodiments. As used with respect to this term, the period of time may be between 0.0001 seconds and 10 seconds, 0.0001 seconds and 0.01 seconds, 0.01 seconds and 1 second, 0.05 seconds and 5 seconds, 0.1 seconds and 1 second, 0.2 seconds and 2 seconds, 1 second and 4 seconds, or 0.1 seconds and 10 seconds in certain embodiments. As used with respect to this term, the majority may be at least 70%, 80%, 85%, 90%, 95%, or 100% of the objects in the scene in certain embodiments. As used with respect to this term, the objects movement relative to the camera may be less than 0.1%, 0.2%, 0.5%, 1%, 2%, 5%, or 10% of the objects distance to the camera in certain embodiments.

The term "simultaneous frames" means the set of images (for example, 2, 3, 4, 6, 9, 16, 20, 32, 64 or other number) taken by one or more cameras of a plurality of cameras within a relatively static time period. In certain embodiments, the set of images taken by one or more cameras of a plurality of cameras within a relatively static time period may be at least 2, 3, 4, 6, 9, 16, 20, 32, or 64. In certain embodiments, all of the one or more cameras of a plurality of cameras may have the same simultaneous frame rate. In certain embodiments, one or more cameras of a plurality of cameras may have different simultaneous frame rates.

The term "multiple simultaneous frames" means a set of simultaneous frames (for example 2, 3, 4 or 5) taken within a relatively static time period. In certain embodiments, the set of simultaneous frames may be at least 2, 3, 4, or 5.

The term "geometric median" means a point constructed to be in a position within a multi-dimensional space amongst a set of data points in that space in such a way that the sum of Euclidean distances to a portion data points (from the median point thus constructed) is minimised. In certain embodiments, the portion of data points may be a substantial portion or each data point. In certain embodiments, the portion of data points may be at least 80%, 90%, 95%, 98%, 99% or 100% of the data points.

The term "diffuse reflection" means the reflection of electromagnetic waves from a surface such that a ray incident on the surface is scattered at a plurality of angles of view such that the spectral data in the reflection is determined substantially by the material of the surface.

The term "specular reflection" means the reflection of light (i.e. electromagnetic waves) from a surface such that a ray incident on the surface is reflected substantially at one angle, and the spectral data in the reflection is determined substantially by the illuminating radiation rather than the material of the reflecting surface.

The term "smoothness constraint" means an assumption that in a scene the spectral data response from a surface has limits placed on the first and/or higher order derivatives of the response as the surface is traversed spatially.

The term "3D video stream" means a sequence over time of 3D scene information where a portion of 3D scene information represents a scene that overlaps at least in part a prior scene. For example, a 3D video stream may be a sequence of 3D point clouds that overlap at least in part and that have been captured over a period of time. As an alternative example a 3D video stream may be a sequence of depth maps that view parts of a scene that overlap at least in part and that have been captured over a period of time. In certain embodiments, a portion of 3D scene information may mean a substantial portion of the scene that overlaps at least in part a prior scene. In certain embodiments, a portion of 3D scene information may mean each of the scenes overlap at least in part a prior scene. In certain embodiments, a portion of 3D scene information may mean at least 50%, 60%, 70%, 80%, 90%, 95%, 98%, 99% or 100% of the scenes overlap at least in part to a prior scene.

The term "3D point cloud" means a 3D scene information where the points in the scene may be selected from the voxel space defined over the scene during a relatively static time period. The point (or points) may be defined to be representative of the voxel based on one or more of the following: 1. the centroid, the nearest vertex, similar representative point (or points), or combinations thereof; 2. a radius or other implied spatial extent from the point or points); and 3. the meta data that was associated with that voxel, where the meta data may include the probability that the voxel was occupied by a surface that reflects electromagnetic signals with a particular spectral characteristic.

The term "3D point cloud Video" means a sequence of 3D point clouds where the 3D point clouds in the sequence may be in time order.

The term "aggregated point cloud" means a 3D point cloud that may be derived (by normalising the coordinate system and at least partially overlaying points) from multiple 3D point clouds that at least partially overlap in 3D space (and therefore represent overlapping representations of the underlying physical scene). The constituent 3D point clouds may be based on one or more of the following: taken at different points in time; may be taken by different physical camera arrays which may be located in different positions; and may be taken by different physical camera arrays moving along different trajectories.

The term "baseline" means the distance between the optical centre of a camera used to capture a first image and the optical centre of a camera used to capture a second image.

The term "disparity" means the distance between the location on one image, of a projection of a feature in a scene, and the location on a second image of the projection of the same feature in a scene.

The term "binocular" means forming or using a pair of images separated by a baseline.

The term "camera array" means a plurality of cameras; wherein one or more of the cameras have overlapping fields of view and the number of cameras is at least 3, 5, 8 or 10. In certain embodiments, the overlapping fields of view may be substantially overlapping fields of view. As used in this term, substantially overlapping fields of view means that at least 50%, 60%, 70%, 80%, 90%, or 95% of the fields of view overlap. In certain embodiments, at least 25%, 50%, 75% or 100% of the one or more cameras have overlapping fields of view. In certain embodiments, the camera array may have at least 4, 5, 6, 7, 8, 9, 10, 11 or 12 cameras. In certain embodiments, the camera array may have at between 12 and 30 cameras, or may have between 30 and 100 cameras, or may have between 100 and 1000 cameras.

The term "salient object" means a plurality of neighbouring voxels that contain a surface such that:
    a. the collection of voxels together form an approximation to a shape that may be predefined as salient (for example, the approximate shape of a traffic light, or traffic sign, or person or building or top of building or unwanted object on a runway, or another plane); or
    b. the surface appears at a location in a scene that may be predefined as salient (such as known location of a traffic light, or an object in the direction of motion and within the confines of the location of a known road); or
    c. the surface moves as a coherent whole, such that the surface appears as a coherent physical object when observed across multiple 3D point clouds.

The term "infinity mask" means a binary 2D image mask whose pixels indicate regions of a scene that may be distant from the camera. Distance may depend on the context. For example, in an autonomous driving system the distant may mean greater than 50 m, 100 m, 200 m, 400 m, 600 m, 1000 m or more. For example, in a wearable device used by an individual distant may mean 5 m, 10 m, 20 m, 50 m, 100 m, 500 m or more. For example, in an aircraft-based system distant may mean 500 m, 1000 m, 2 km, 5 km or more.

The term "long range" means at a range far from the camera array. For example, in an autonomous driving system long range may be greater than 50 m, 100 m, 200 m, 400 m, 600 m, 1000 m or more. For example, in a wearable device used by an individual long range may be 5 m, 10 m, 20 m, 50 m, 100 m, 500 m or more. For example, in an aircraft based system long range may be 500 m, 1000 m, 2 km, 5 km, 10 km or more.

The term "passive optical system" means a system that does not require the emission of light or light patterns into the scene to operate. A passive optical system may utilise secondary illumination sources not regarded as part of the system to assist in various circumstances and/or environmental conditions, for example the headlights of a vehicle in low light (e.g. at night).

The term "real time" means processing may be sufficiently fast that resulting information may be used for making decisions substantially at the time of operation. For example, in an autonomous driving system, a vehicle, a train or an aeroplane real-time may be processing that is performed within 10 seconds, 1 second, 100 mseconds, 10 mseconds, 1 mseconds, 100 nseconds or less. In certain embodiments, real-time processing may be performed between 100 nseconds to 10 seconds, 100 nseconds to 1 second, 100 nseconds to 100 mseconds, 1 msecond to 10 second, 1 msecond to 1 second, or 1 msecond to 100 msecond.

The term "real time frame rates" means the capacity of a processing system to produce a sequence of 3D point clouds at a rate that the camera array takes the image sequences. For example, in processing image data the real time frame rate may be 1, 10, 30, 60 or 100 frames per second. In certain embodiments, in processing image data the real time frame rate may be at least 1, 10, 30, 60 or 100 frames per second. In certain embodiments, in processing image data the real time frame rate may be between 1 to 100, 1 to 60, 1 to 30, 1 to 10, 10 to 100, 10 to 60, 30 to 100, 30 to 60, or 60 to 100 frames per second.

The term "small irrelevant particle occlusions" means one or more transient objects that may be ignored, or substantially ignored, for the purposes of a particular application of the system. For example, in the case of driving a standard car along a road, raindrops may not need to be avoided and may not represent a safety threat. In this application therefore raindrops may be deemed small irrelevant particle occlusions. Further similar examples include one or more of the following: snow, hail, dust, individual leaves floating in the air, and insects.

The term "moderated" means reduced, increased or adapted and may be in response to a certain data, information or an intermediate calculated result. For example, a decision threshold maybe moderated based on additional information deemed pertinent to the decision.

The term "processing engine" means a device or component for performing processing such as a computer system, embedded micro-processor system, FPGA system, ASIC system or combinations thereof. A processing engine may comprise components for computation, memory storage, and/or communication. An example of a processing engine is illustrated FIG. 1. and described elsewhere in this text.

The term "generate" as used with a respect to a voxel or a voxel space is defined in this disclosure as: for one or more voxels in a voxel space determine information about portions of the scene represented by the one or more voxels. For example, to 'generate a voxel space' may be to determine that, for one or more voxels in the voxel space, the portions of the scene represented by the one or more voxels are occupied by surfaces. Other examples of uses of the term generate include: generate a plurality of voxels, generating a three-dimensional streaming voxel space, or generate at least one voxel space. In effect, to "generate" a voxel space as used in this disclosure means to generate the informational content of one or more voxels that comprise the voxel space.

Certain Exemplary Advantages

In addition to other advantages disclosed herein, one or more of the following advantages may be present in certain exemplary embodiments:

One advantage may be that an accurate 3D video stream may be calculated at real time frame rates, or substantially real time frame rates, to enable navigation decisions by higher level systems. Examples of such navigation decisions include, but are not limited to, trajectory selection, collision avoidance, road following, driving risk assessment, safe speed determination, driver assistance, driver alerts, safe distance following, personal space navigation, or combinations thereof.

Another advantage may be there is no need, or lesser need, for other sensors (for example, radar and/or LiDAR). This reduction in the need for other sensors substantially reduces the cost and/or complexity of implementing autonomous navigation in vehicles, robots and/or planes whilst also improving accuracy. In certain embodiments, however, other sensors (for example ultrasonics, radar and/or LiDAR) may be added to supplement the system.

Another advantage of certain embodiments may be there is not a need, or less of a need, for complex integration between disparate sensor systems. This substantially reduces the cost and/or complexity of implementing autonomous navigation in vehicles, robots and/or planes whilst also improving accuracy. It is contemplated in the present disclosure that integration between disparate sensor systems may also be included in certain embodiments.

Another advantage of certain embodiments is that it reduces the impact of particle occlusions (for example, one or more of the following: rain, snow, dust, and insects) on the system, noise that constrains alternative approaches, in particular LiDAR, as the visible impact of such occlusions in 2D images made using sensor elements sensitive to many of the spectral ranges in and near the conventional visual spectrum is minimal.

Another advantage of certain embodiments may be that salient object trajectories may be calculated without object classification. Certain embodiments may still allow the identification and/or classification of objects using artificial intelligence (AI) or other methodologies. This reduction in the need for object classification is an advantage at least in part because such classification process approaches typically may be done with neural networks, necessitating extensive learning on massive data sets and introducing the possibility of errors that may be acute when presented with data that is unusual and not in the training set.

Another advantage of certain embodiments may be that an accurate 3D video stream may be calculated at real time frame rates, or substantially real time frame rates, tracking objects in a scene to enable security and surveillance of streets, parks, private or public spaces or buildings where real time, 3D information may allow tracking people, identifying actions and activities, assist with detection of unusual behaviours, determine information about the flow of people or vehicles in a space, determine alerts such as collisions or slip-and-fall, monitoring the size of crowds, or monitoring the flow of crowds or the potential for crushing in crowds.

Computing depth information, such 3D Scene Information, from 2D image data is an issue in the art. That is the determination of depth at a particular point in a scene may be ambiguous from the 2D image data, for example, because substantial different scenes in the real 3D world may produce the same representation, or substantially the same representation, (i.e., appearance) when viewed from a given set cameras. For example and to illustrate, if a portion of a scene has a complex depth profile but is uniform in appearance in a set of 2D images then the determined 3D scene information for this part of the scene may not correctly capture the complex depth profile of the original scene. Thus, solutions often face the challenge of optimising over the many (and sometimes infinite) possible 3D scene configurations that may give rise to a given set of 2D images provided as input. Optimization may require a cost function and the cost function may include regularization terms. A cost function may attempt to balance different input data and constraints to find a reasonable solution for the depth at a point in the scene. A regularisation function may further work to smooth the solution so that where available observed data is low the solution may be a sensible selection and avoid being distracted by noise or spurious observed data. However, cost functions and regularisation terms may be based on assumptions about a scene and on heuristics. These assumptions and heuristics may lead to inaccuracies in the 3D scene Information. Further, many regularised cost functions result in a problem characterised in the art as NP-Complete, and thus are effectively difficult to solve in a reasonable time. Exemplary embodiments of the present disclosure are direct to resolving one or more of these ambiguities and provide solutions that better matching the real scene, and with reduced computationally requirements.

System Diagram

Certain embodiments are directed to using passive optical systems to produce 3D scene information of scenes in real time, or substantially real time.

Certain embodiments provide an optical camera solution that may be built using cameras in a fixed array that view a scene from different positions simultaneously. The resultant differences between two views of the scene (disparity), may be compared to compute depth information. This may be accomplished by moving individual pixels of one image to match pixels on another image. The degree of movement necessary (disparity) depends at least in part on the distance from the cameras to the object resulting in the particular pixel pairs in question, and also depends at least in part on the distance between the two cameras (baseline). For example, a wider baseline may result in higher long range accuracy but may have problems with increased minimum distance, as the views may not overlap near the cameras.

Exemplary Camera Array

FIG. 1 shows a system diagram 100 of certain exemplary embodiments. The system includes a camera array 110 and a processing engine 115.

The camera array 110 includes a set of cameras laid out in an array of M wide and N deep. Horizontal rows of the array are indicated with the dotted lines 125, 135, 145. The cameras, such as 120, 130, 140 are described in detail herein. Although FIG. 1 shows a regular array, embodiments exist where the array is not regular, where rows may not contain the same number of elements, where elements differ according to their spectrum sensitivity, or even where the array is not in a single vertical plane. For example, the cameras may be arranged in a circular pattern, a zigzagged pattern, a scattered pattern and some of the cameras may be offset (but still fixed) in one or more of the three dimensions. FIG. 12. illustrates a variety of examples of camera array configurations including A) a rectangular array of 2×2 cameras, B) a rectangular array of 3×2 cameras, C) a rectangular array of 3×3 cameras, D) a rectangular array of 4×4 cameras, E) a configuration of 12 set about the perimeter of a rectangle, F) a configuration of 12 set about the perimeter of a rectangle with a further 6 camera set about the perimeter of a smaller concentric rectangle, G) a rectangular array of 2×5 cameras in vertical orientation, H) a rectangular array of 6×2 cameras in a horizontal orientation, I) a configuration of 8 cameras set about the perimeter of a circle, J) a configurations of 13 cameras set about the perimeter of a circle with a further 8 cameras set about the perimeter of a smaller concentric circle. Further configurations designed based on the use-case or vehicle are given as examples in FIG. 9. and FIG. 10. and are described in detail elsewhere in this disclosure.

In certain embodiments, the relative position and orientation of cameras in the camera array is known, and that the cameras in the camera array have a hardware synchronised trigger for simultaneous frames to be captured across the array. In certain embodiments, the camera array may include related circuitry to ensure synchronised capture of images from cameras in the camera array 110.

The processing engine 115 includes a receiving unit 150 for communication with the cameras in the camera array 110. The receiving unit is connected via communication bus 151 with the processor unit 160, and a memory unit 170. The processor unit 160 may be a general purpose CPU or GPU or may be customised hardware such as an FPGA or ASIC especially designed to perform the required processing. The memory unit 170 may include volatile and/or non-volatile memory. It may store instructions for the processing unit 160 as well as image data received from the receiving unit 160 via the communications bus 152. The processing unit 160 may also be connected to a data store 190 via communications bus 162. The processing unit 160 is also connected to an external communications unit 180 via 163. The communications unit 180 is used to output a 3D video stream for the use of external systems. The communications unit 180 may also receive data from external sources including position data, map data and/or previously recorded 3D data regarding the scene.

Cameras in the camera array 110 may be connected to the processing unit 115. Cameras have a communication channel indicated by 121, 131, 141 to accept control and/or synchronisation signals and to output image data. In certain embodiments, communication channels may utilise wired communication methods such as USB, IEEE1394, GMSL and/or ethernet. In certain embodiment communication, channels may utilise wireless communication such as WIFI, Bluetooth or 5 G. In certain embodiments, communication channels may utilise wired and wireless communication methods. Synchronous capture of images from cameras in the camera array 110 may be useful and may be enabled by the communication channel 121, 131, 141.

Exemplary Camera System

Figure 2:
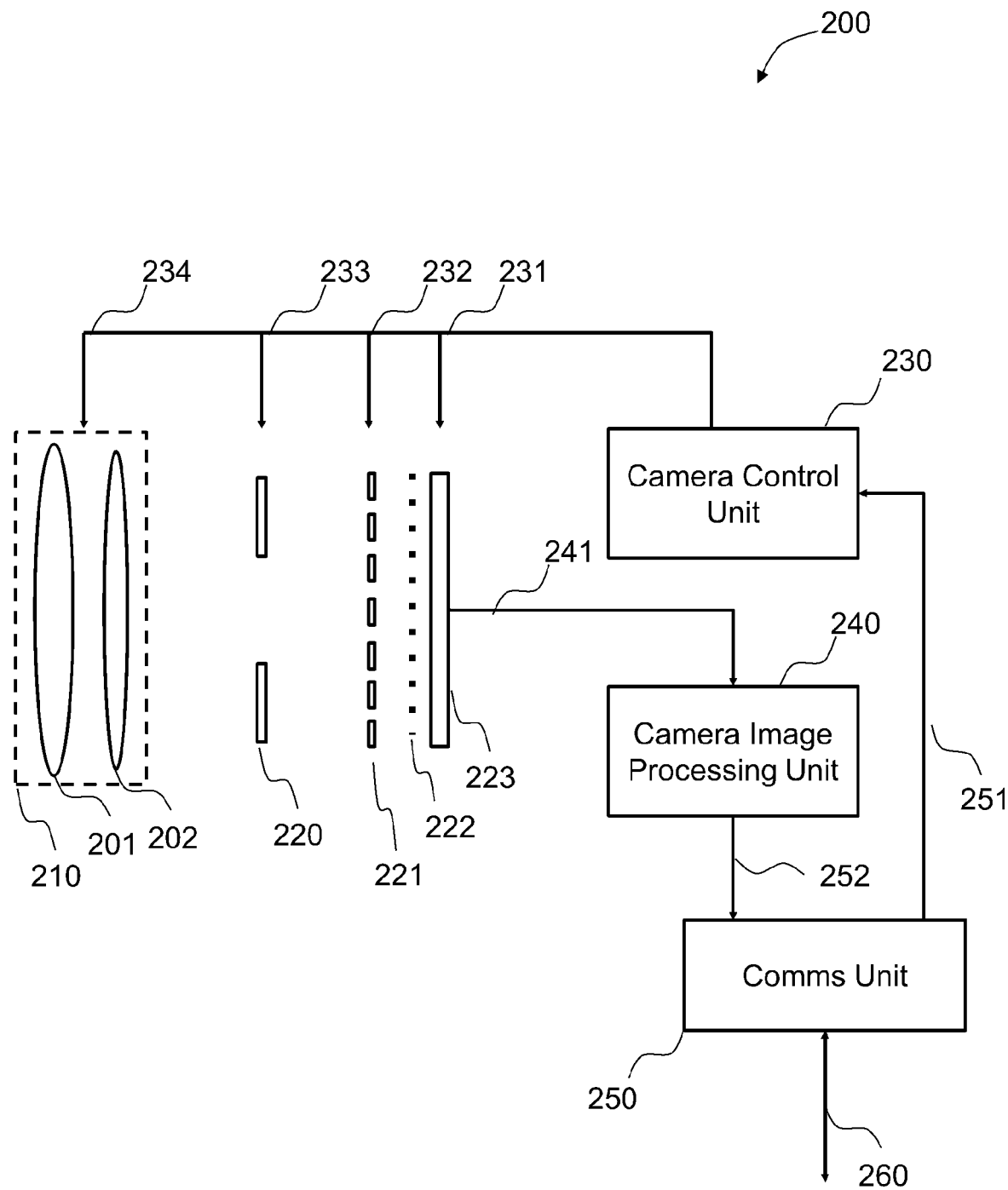
FIG. 2 is a schematic component diagram for a camera used in a camera array, according to certain embodiments.

FIG. 2 describes the details of an exemplary camera system 200 which is used for cameras in the camera array 110. The camera system includes a lens module 210 consisting of optical elements 201, 202. There is also an aperture 220, a shutter 221 and a sensor 223. In certain embodiments, the sensor 223 may be overlaid with a filter array for example a Bayer filter 222 which enables the capture of colour and/or multi-spectral images. The sensor 223 may be sensitive to a portion of the electromagnetic spectrum, including potentially one or more of the following: the visual, the infra-red and the ultraviolet spectrum.

The sensor 223 is connected to a camera image processing unit 240 which may perform image processing of raw image data captured by the sensor 223. In certain embodiments, the image processing steps may include one or more of the following: de-Bayering, compensating for lens distortion, and colour adjustments. In certain embodiments, lens distortion processing unwarps the images so that images conform to a pin-hole camera model. Processed images may be passed via communication bus 252 to the communications unit 250. Processed image data may be sent via 260 to the processing engine 115. The communications unit 250 may also receive control and/or synchronisation signals from the processing engine 115. Control and/or synchronisation signals are passed onto camera control unit 230. The camera control unit 230 actions camera control signals via control lines 234, 233, 232, 231 enabling adjustment of one or more components of the lens system 210: the aperture 220, the shutter 221 and the sensor 223. Such controls may be used to adjust one or more of the following: imaging parameters (such as gain), exposure times, black level offsets and filter settings. The camera control unit 230 may also coordinate the activation of one or more of the following: the aperture 220, the shutter 221 and the sensor 223 to capture images. The camera control unit 230 may receive a synchronization signal via the Comms Unit 250 which ensures that cameras in the camera array 110 are synchronized to capture images simultaneously.

The Bayer filter 222 may be used to pass or block specific bands of the electromagnetic spectrum on a pixel by pixel bases. FIG. 11A shows an example of a Bayer pattern used in the Bayer filter 222 where the filter elements are in a grid that may match or align with the grid of sensor elements, also known as pixels, on the image sensor 223. In this way the bands of the electromagnetic spectrum reaching certain pixels in sensor 223 may be selected. A grid 1110 of filter elements are arranged in a pattern with elements of type "a" 1111, "b" 1112 and "c" 1113. For example, in a Red-Blue-Green or "RGB" filter elements shown as "a" 1111 pass green light, elements shown as "b" pass red light and filter element shown as "c" would pass blue light.

An alternative filter array arrangement is shown in FIG. 11B where four different bands of the electromagnetic spectrum can be selectively passed or blocked as shown with the arrangement of four types of filter elements "a" 1121, "b" 1122, "c" 1123 and "d" 1134.

A second alternative filter array arrangement is shown in FIG. 11C where eight different bands of the electromagnetic spectrum can be selectively passed or blocked as shown with the arrangement of eight types of filter elements. "a", "b", "c", "d", "e", "f", "g" and "h".

The bands of the electromagnetic spectrum passed or blocked in the filter elements are designed to be informative in the determination of surfaces. Design of the bands may be in consideration of one or more of the following: the environment, the types of elements expected in the scene, and the specular characteristics of the elements in the scene (including properties such as spectral reflection or diffuse reflection, texture, and/or material characteristics at particular electromagnetic bands). Even if some sensor elements have the same filter as some of their neighbours the small physical separation combined with their individual spectral responses still captures potentially useful information about the target surface due to their small spatial separation. In some embodiments, this collective output of spatial and spectral information together forms the electromagnetic signature of the surface at which these pixels are directed and may collectively be referred to as the surface points' spectral response when imaged with such an image sensor. In certain embodiments, successive responses (over time) of the sensor may be used to estimate apparent image motion; commonly known as "optical flow" in the art. Optic flow values describe the apparent motion of the image being sampled by a particular pixel in a two dimensional direction across the image sensor surface (generally for conventionally rectangular sensor arrays with elements arranged in rows and columns, the "optic flow" values are the number of pixels left or right in a horizontal orientation, and the number of pixels up or down in a vertical orientation the projection of the scene moves across the sensor array within a small time—most simply successive frames taken by the sensor array separated by a fraction of a second). Such optic flow data may be included into the spectral data and may be used in similarity tests comparing projected scene data from different cameras.

Exemplary Illustrative Scene

Figure 3:
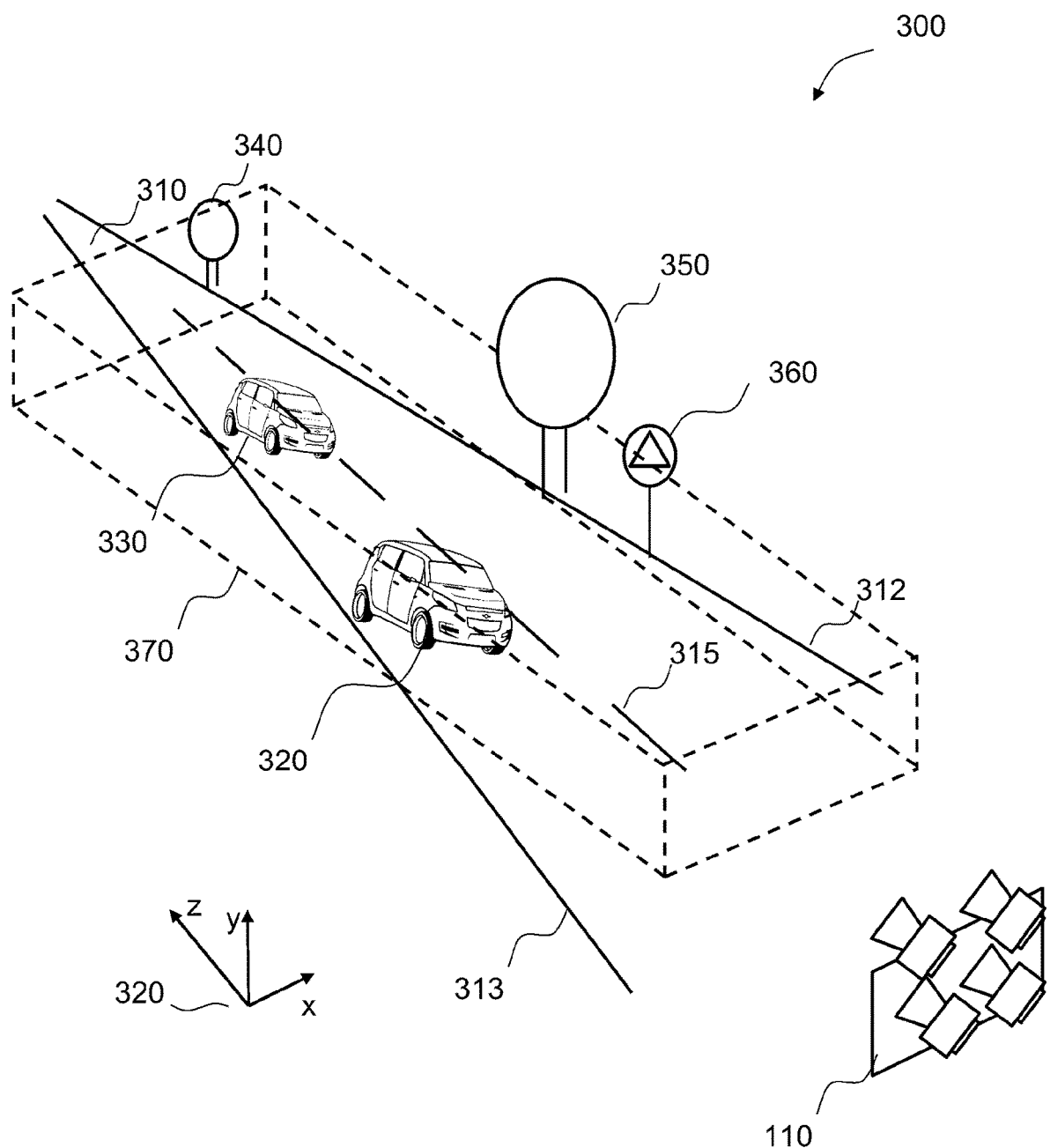
FIG. 3 is an illustration of an exemplary real-world scene observed by a camera array and showing a 3D volume of interest may be represented digitally as a multitude of voxels (i.e. the "voxel space"), according to certain embodiments.

FIG. 3 shows a typical road scene 300. The road 310 is illustrated with lines 312, 313 marking the edge of the road marking 315 for the centre line of the road 310. In this scene there are two cars 320, 330 on the road. Also shown are trees 340, 350 and a sign 360, positioned to the side of the road. A camera array 110 is shown oriented to observe the scene. The camera array 110 may be located on a vehicle (not shown) and may itself be travelling along the road. A dashed rectangular prism marks the extent of a voxel space 370, positioned in the view of the camera array 110 for which 3D data may be generated using images from the cameras of the camera array 110.

Exemplary Voxels and Images

Figure 4:
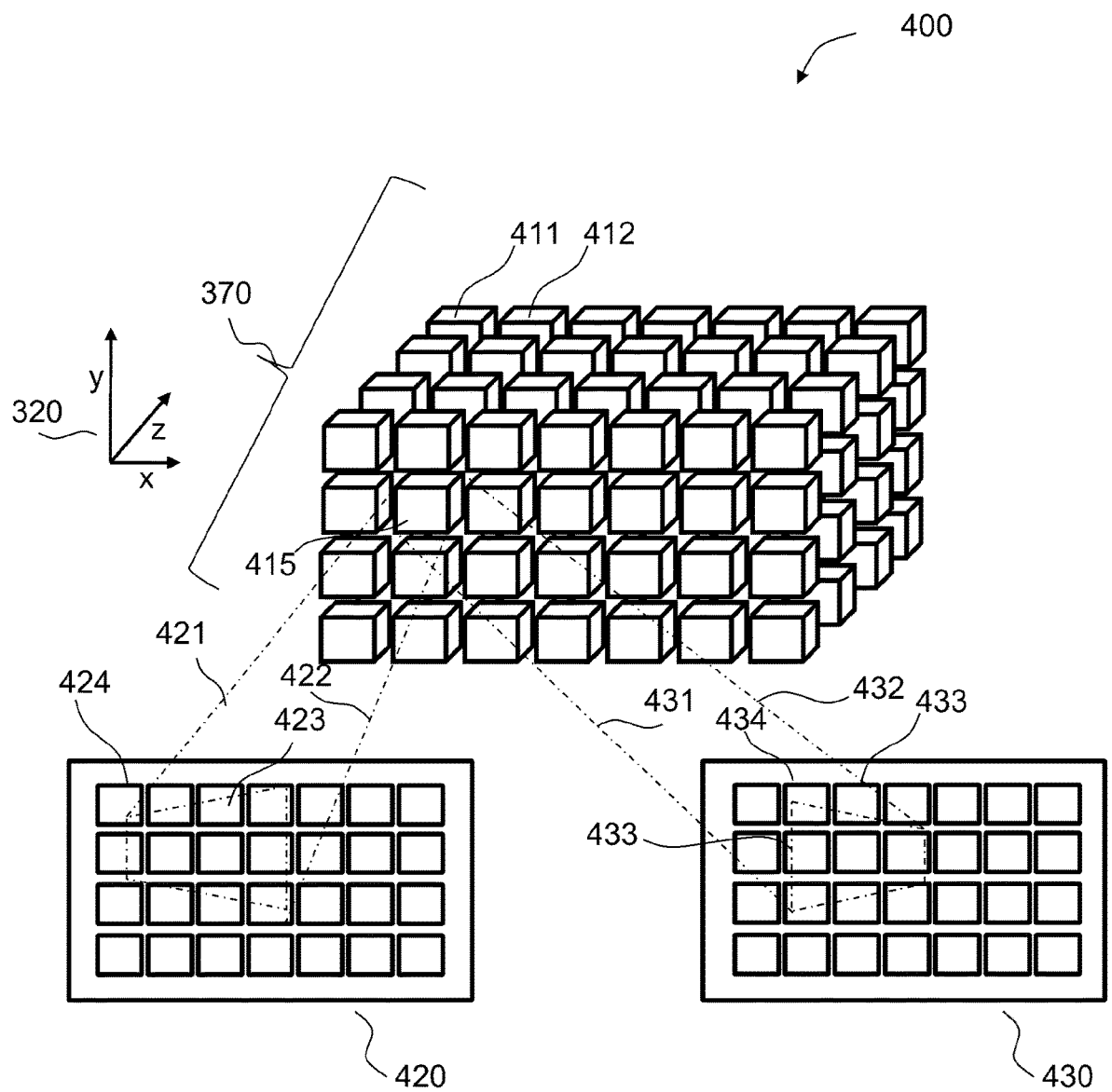
FIG. 4 is an illustration of the voxels in a voxel space, and their relationship to and/or projection into images from cameras in a camera array, according to certain embodiments.

The voxel space 370 is segmented into a 3-dimensional voxels. In FIG. 4 the voxel space 370 is shown segmented into cubic voxels such as 411, 412, according to certain embodiments. In certain embodiments, cubic voxels may be used though it is equally possible to segment the voxel space using cuboids, spheroids, spheres or other 3-dimensional elements that may not all be the same shape, that may not collectively cover all the physical volume of the space (i.e., may have gaps between the elements), or may have some proportion of overlap between neighbouring elements. In the certain embodiment, a representation of the voxel space may be held in memory 170 using a three dimensional array with elements being addressed in the X, Y, and Z directions 320.

In another embodiment the representation of the voxels is maintained in a sparse data structure for example in a linked list, double linked list, hash table, or a sparse array.

In certain embodiments, the extent and/or shape of the voxel space may be determined dynamically. The voxel space extent and/or shape may be determined in response to the content of the scene such as the detected foreground objects and/or prior knowledge of certain elements in the scene such as the path of the roadway.

In certain embodiments, the voxel size may be varied depending on the location in the voxel space so that voxels at a distance are larger than voxels near the camera array enabling higher 3D resolution near to the camera array 110. In certain embodiments, some voxel may be divided into smaller voxels under certain conditions, for example, an original cuboid shaped voxel may be divided into eight approximately evenly sized smaller cuboid shaped voxels. In certain embodiments, voxels in close range, for example in the nearest 20%, 30%, 40%, or 50% of the voxel space maybe so divided and used to generate higher resolution of 3D information in the region nearer to the camera array. In certain embodiments, the voxels size may be dynamically responsive to the content of the scene such as the detected foreground objects or prior knowledge of certain elements in the scene such as the path of the roadway. Where a voxel is known to include a foreground object then the voxel maybe split into finer parts to provide greater resolution in this area of interest. Equally if the voxel occupancy of a scene suggests there is a physical surface that is not aligned to the original voxel grid or shape, then the system may re-segment part or all of the voxel space with different voxel shapes and/or alignment to better fit the apparent surfaces in the scene (and thereby make higher fidelity models of the scene).

In certain embodiments, the size of a voxel, such as 415, may be variable, and may be adjusted based on one or more of the following: regions with texture, regions with salient objects, regions with occlusion, regions with flat appearance, regions with low texture, regions with small or irregular features, alignment to image features, and alignment to elements in the scene.

Further, in FIG. 4. illustrates two observed images 420 and 430 where, for example, image 420 may be captured from say camera 130 in the camera array 110 and image 430 may be captured from camera 140. In camera array 110 consisting of 5×3 camera there may be 15 such 2-dimensional images.

The images 420, 430 are an observation of the scene 300 from a slightly different point in space and therefore a given voxel may be observed by a different portion of the images. Considering voxel 415 highlighted in dark shading, dashed lines 421 and 422 show the projection of voxel 415 to the 2-dimensional image 420 with dashed shapes 423 showing the extent of the projection on the image 420. Similarly, dashed lines 431 and 432 show the projection of voxel 415 to image 430 with dashed shape 434 being the extent of the projection on the image 420.

Images 420, 430 may be stored in a digital form as an array of discrete pixels, for example 424 and 434. As shown, pixels in the 2D images are not aligned with the boundaries of the projected 3D voxels and some pixels such as 424 and 434 are only partially covered by the projection of the voxel 415.

If a voxel is occupied by the surface of an element such as a car 320 in the scene 300, then the light observed from this voxel may be consistent. For example, if voxel 415, was located at the surface of car 320, spectral values for pixel 422 and pixel 432 may be similar since they both observe light from the same region of an observable surface on car 320 (ignoring for illustration purposes specular reflections that would cause different appearances for different cameras). The spectral values of the pixels in the projection 423 and 433 may be weighted depending on the proportion of overlap of the projections on to the pixels.

For a camera in camera array 110 and a voxel in the voxel space, the mapping from voxel to pixel locations, and the weighting of each pixel, may be computed given the known measurements of the camera array 110, the known intrinsic and/or extrinsic parameters of the cameras in the camera array 110 and the known relationship to the voxels in the voxel space. In some embodiments, the mapping between voxels and image locations and the pixel weightings are precomputed and stored for repeated use, enabling efficient processing of the image data.

Exemplary Main Process

Figure 5:
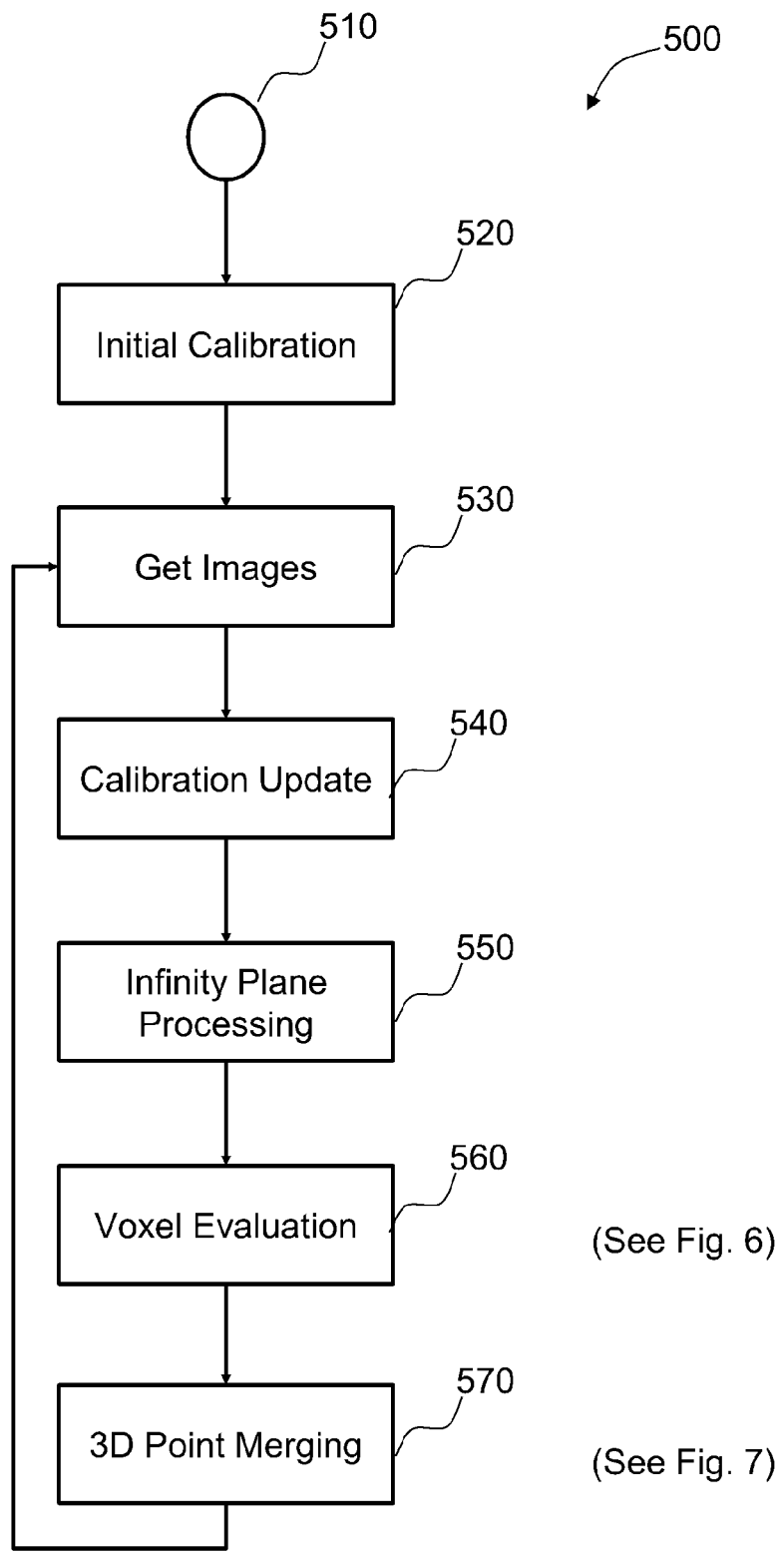
FIG. 5 is a top-level flow chart of an exemplary method for creating a 3-dimensional video stream, according to certain embodiments.

FIG. 5 shows a top-level flow chart, according to certain embodiments. Starting from 510 the exemplary system and/or method may proceed to perform initial calibration 520.

In this example, initial calibration 520 involves calibration of the cameras in the camera array 110 so that later stages may operate with images that are calibrated and registered to normalize their viewpoint. Initial calibration 520 is described in detail elsewhere in this disclosure.

Following initial calibration 520 flow proceeds to the step get images 530. In this step the processing engine 115 firstly operates the camera array 110 to capture a set of simultaneously captured images from cameras in the camera array 110. The camera array 110 may provide de-Bayered images to the processing engine 115.

Following get images 530 flow proceeds to calibration update 540. The step calibration update evaluated images received in the previous step and performs calibration checks and/or updates that may be performed online. In some embodiments, known elements in the scene 300 such as road markings 315, signs 360 or buildings or purpose built calibration markers may be used for one or more of the following: to check the accuracy of calibration parameters, to re-estimate the calibration parameters, and to perform an incremental update of the calibration parameters. In some embodiments, feature points in the images may be matched and an accurate position change may be known from one or more of the following: odometry, GPS, 3G, and other independent sources and may be used to determine updated calibration parameters. The updated calibration parameters may include one or more of the following: image response parameters, intrinsic parameters, and extrinsic parameters that may be stored so that they may be used in later steps.

Following calibration update 540 flow proceeds to infinity plane processing 550.

Infinity plane processing 550 generates an infinity mask. In this example, an infinity mask is a binary mask with the same, or substantially the same, dimensions as the images from the cameras in the camera array 110. The infinity mask indicates where images are observing elements in the scene at approximately infinite distance, which is beyond the furthest extent of the voxel space 370. Since the cameras in the camera array are pointed in a predominantly parallel direction and with predominantly the same orientation and, since the images have been de-warped and corrected for conventional geometric and chromatic lens distortions to present an idealised pin-hole camera view of the scene, points at infinity project a known pixel location in images from cameras in the camera array; except where an occlusion by an element in the scene occurs. Therefore, if pixels at these particular image locations match on at least some of the cameras from the camera array then it may be assumed these pixels are projected from infinity, or effectively form an extreme distant range. In a scene 300 cameras in the upper row 125 of camera array 110, are positioned higher above the road 310 and have a view of the horizon in comparison to cameras in row 135 and row 145 which may have their views occluded by elements such as the cars 320, 330 on the road. Therefore, it may be beneficial to perform infinity processing on a per row basis, for example, with various combinations of cameras from the array (i.e., not necessarily using all cameras during each application of the Infinity plane processing).

In this example, infinity plane processing operates as follows:

```
FOR each of a selection of cameras in the array
    FOR each image location (x, y) that from de-warping facilitated by
    known calibration represents parallel rays of light that would only
    emanate from objects at a large distance (effectively at infinity)
        IF pixel at (x, y) is similar in
            at least a selection of camera images
        THEN
            set the infinity_mask at (x, y)
        ELSE
            clear the infinity_mask at (x, y)
```

Once generated the infinity mask is stored in the memory unit 170 for use by subsequent processing steps.

The similarity of two pixels may be determined by a spectral data similarity measure, for example calculated as the maximum of the differences of the corresponding colour or spectral data. A threshold value for similarity may be used to determine if the similarity is sufficiently high given the presence of noise and error in the system. In some embodiments, a fixed threshold may be used. In certain embodiments, with images in RBG, with 256 levels per channel, similarity may be the simple sum of absolute differences and a threshold of 5 or less may be taken as sufficiently similar to warrant marking a certain voxel as occupied by a surface of an object. In certain embodiments, a threshold value of 1, 2, 3, 4, 5, 6, 10, 20, 50 or more may be used to determine similarity. In some embodiments, more types of spectral information may be compared, such as optic flow data as well as one or more colour channel responses, to determine the measure of similarity. In some embodiments, the threshold may be set dynamically and may be determined based at least in part on one or more of the following: the noise profile of the camera system, estimation of the calibration accuracy, the camera position in the camera array 110, time of day, known environmental conditions (i.e. it is raining) and the pixel location in the image.

Following infinity plane processing 550 flow proceeds to voxel evaluation 560. In this step the images from the camera array 110 and the infinity mask may be used to determine the occupation status or probability of occupation status of a voxel and, if occupied, then a representative colour or spectral data is assigned to the voxel. voxel evaluation 560 is described in further detail elsewhere in this disclosure.

Following voxel evaluation 560 flow proceeds to 3D Point Merging 570. In this step voxels observed to be occupied may be transformed into 3D point cloud which may be aligned and merged with previously captured 3D point cloud data. 3D Point merging 570 is described elsewhere in the present disclosure.

Following 3D Point Merging 570 flow returns to get images 530 and thus acquires updated image data from the camera array 110 and goes on to repeat the process. As the camera array 110 moves through a scene 300 a comprehensive 3D point cloud data may be accumulated over time and an ongoing 3D video stream may be generated.

Initial Processing

Returning to the detail of the step initial calibration 520. Initial calibration may be performed offline, for example, as part of manufacturing or servicing of the system. For example, initial calibration may be performed using one or more test charts and/or objects which may be positioned in various locations in the field of view of the camera array, or potentially just marked elements in the scene whose positions are known precisely. One aspect of the initial calibration 520 may be to determine image response parameters needed to adjust cameras in the camera array for a consistent colour or spectral data response. This may useful as images captured from cameras in the camera array 110 may be compared at the pixel level. Another aspect of initial calibration may be to measure a camera's intrinsic parameters which may include one or more of the following: focal length, optical centre, skew coefficients, and radial distortion coefficients. Another aspect of camera calibration may be to measure each camera's extrinsic parameters which accurately describe the relative position and orientation of cameras in the camera array 110. The calibration parameters including image response parameters, intrinsic parameters and/or extrinsic parameters may be stored so that they may be used in later steps.

Voxel Evaluation

Figure 6:
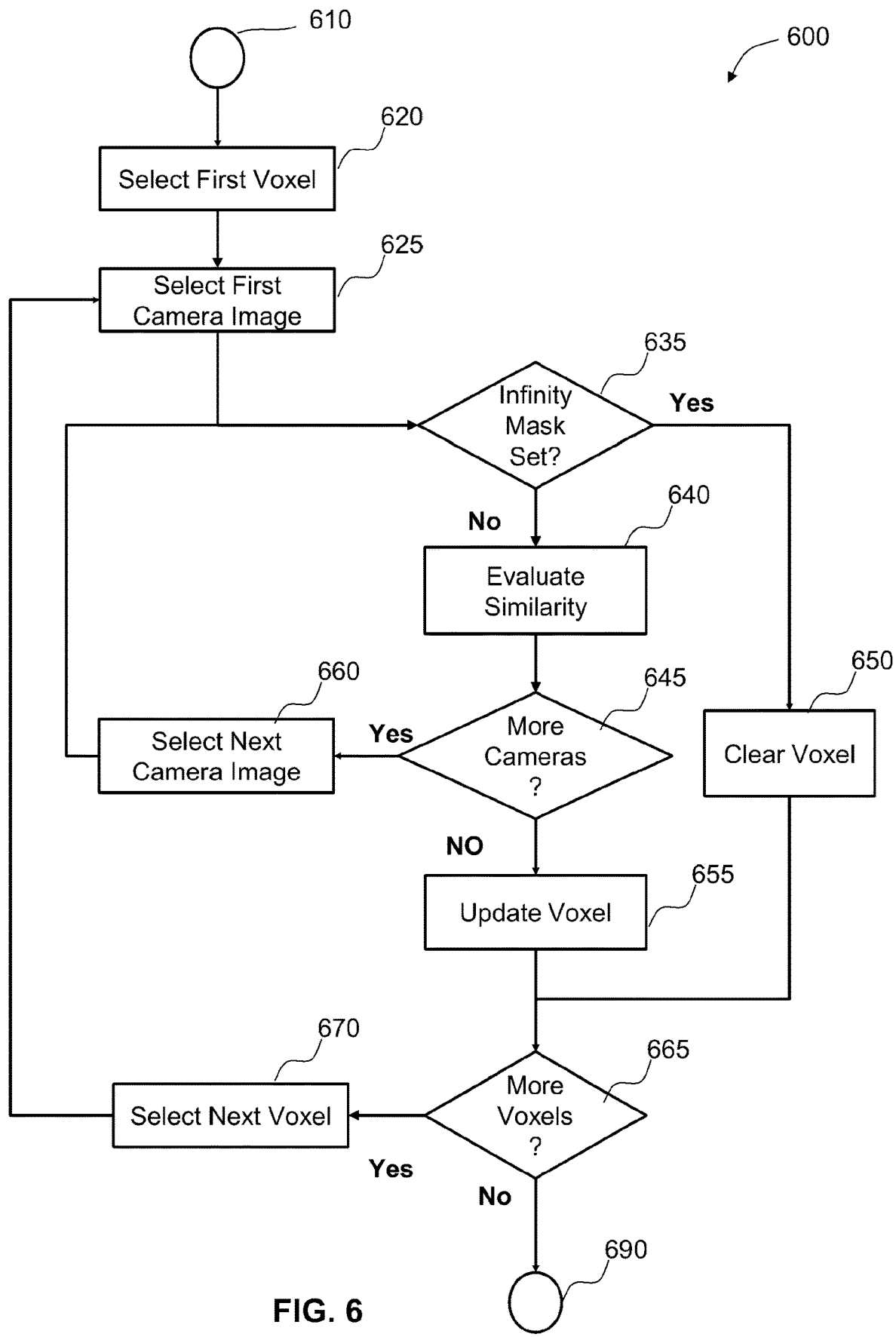
FIG. 6 is a flow chart of an exemplary voxel evaluation process, according to certain embodiments.

FIG. 6 is useful for returning to the detail of the step voxel evaluation 560. This step is directed to identifying, for voxels in the voxel space, if the voxel contains an observable surface. If the voxel is judged to contain an observable surface then the internal representation of the voxel may be marked occupied and a representative colour or spectral data will be associated with that voxel. If the voxel is judged not to contain an observable surface then it is marked null and a null is recorded for the representative colour or spectral data. A null state of a voxel indicates that the voxel may be in free-space or may not be observable due to occlusion between it and the camera array 110.

voxel evaluation starts at 610 and proceeds directly to select first voxel 620 which together with 665 and 670 form a loop to iterate over the voxels in the voxel space. In some embodiments, voxels may be processed in depth order starting near the camera array 110. This allows that processing of voxels that may not be observable because of occlusion and may be skipped for efficiency. The process flow proceeds to select first camera image 625 which, along with steps 645 and 660 form a loop over the cameras in the camera array 110.

From select first camera image 625 control moves to the step infinity mask set 635 which evaluates if the infinity mask is set for a pixel location corresponding to the voxel. First the set of pixel locations on the image 420 contained by projection of the voxel on the image 424 may be determined. In certain embodiments, the mapping from voxel to pixel locations (and vice-versa) may be precomputed and may be stored in a look-up-table or similar data structure for computational speed. In some embodiments, the mapping from voxel to pixel locations may be computed given the known measurements of the camera array 110, the known intrinsic and extrinsic parameters of the cameras in the camera array 110 and the known relationship to the voxels in the voxel space.

A voxel through which elements of the scene beyond the voxel space are visible may be reasoned to be empty. If a pixel location for a camera in the camera array has its corresponding infinity mask set then the process moves to clear voxel 650. At clear voxel 650 the internal representation of the voxel may be updated with a state of empty and colour or spectral data may be set to null. Processing then continues with step more voxels? 665.

Returning to infinity mask set 635, if no pixel location has its corresponding infinity mask set then the process moves to evaluate similarity 640.

At evaluate similarity 640 the process may again consider the image pixels corresponding to the voxel in the current selected camera image according to the voxel projections and may compare these pixel values with the image pixels corresponding to the voxel in other camera images. Where the pixels corresponding to the voxel are the similar then the voxel likely represents a portion of the scene containing an observable object surface. Where the image pixels corresponding to the voxel are not similar for a subset of camera images then that voxel represents a portion of the scene that is empty (and the cameras are seeing a surface beyond the voxel) or is hidden by some foreground object and is not currently observable from one, some or all of the cameras in the array 110.

Evaluate similarity 640 calculates representative voxel projection spectral data for a camera image's observation of the voxel. In certain embodiments, the representative voxel projection spectral data may be calculated as the weighted mean using precomputed mapped pixels and/or weights. In certain embodiments the representative voxel projection spectral data may be calculated using a robust statistical estimator over pixels mapped to the voxel from cameras in the camera array. In certain embodiments the robust statistical estimator may be the median or the geometric median. In certain embodiments the robust statistical estimator may be a trimmed mean. The use of a robust statistical estimator may help avoid the representative voxel projection spectral data being skewed by outliers in the spectral data such as may be caused by specular reflections from physical surfaces and/or occlusions suffered by one or more of the cameras.

Next, the representative voxel projection spectral data may be compared between cameras to determine the popular agreement of similarity by a subset of the images. Similarity may be determined by a spectral data similarity measure. The spectral data similarity measure may include apparent image motion estimates at pixel locations; such data is commonly known in the art as "optic flow".

This is further described in pseudo code below.

```
FOR each voxel projection spectral data 'target'
  FOR all other voxel projection spectral data 'C'
    IF 'target and 'C' are similar within
      a tolerance
    THEN
      add vote to 'target'
IF most votes > consensus threshold
  RETURN
    voxel status = Occupied
    spectral data = projected, collected and optionally filtered spectral data
from one or more images in which the voxel is at least partially visible.
```

A spectral data tolerance for similarity may be used to determine if the similarity is sufficiently high given the presence of noise and error in the system. Use of a suitable spectral data similarity measure and suitable tolerance and threshold enables similarity to be determined even in the presence of small irrelevant particle occlusions in the scene.

In some embodiments, the spectral data tolerance may be a fixed value, for example, the spectral data tolerance may have a value of 1, 2, 3, 4, 5, 6, 10, 20, 50 or more.

In some embodiments, the spectral data tolerance may be set dynamically and may be determined based at least in part on one or more of the following: the noise profile of the camera system, estimation of the calibration accuracy, the relative camera position within the array, known environmental conditions (e.g. it is night-time or it is raining), and the pixel location. In some embodiments, the spectral data tolerance may be set dynamically and may be determined based at least in part on one or more of the following: the noise profile of the camera system, and estimation of the calibration accuracy.

In some embodiments, the spectral data tolerance may be varied dynamically and may be based on probability estimations of voxel occupation determined by previous iterations of the method; for example, when being used in a real-time context and the characteristics of previous frames and earlier data processing are available and relevant due to temporal proximity.

In an alternative embodiment the spectral data tolerance may be moderated by known information about voxels already processed. For example, if a strong signal of occupation is found at a certain 3D voxel then the spectral value tolerance for registering occupied voxels along rays that converge at this strongly recognised voxel may be adjusted to bias intermediate voxels to become marked as transparent. Similarly, and particularly if noise (rain, snow etc.) is present, an almost matching agreement at a particular 3D voxel might be raised to "occupied" status if it is still the highest voted position along a range of rays that pass through it and such rays collectively register weak signals that together may be taken as evidence of a surface with added noise.

In an alternative embodiment, the spectral data tolerance may be moderated by known a priori information regarding the space being observed that particularly includes information derived from registered point clouds that have been observed multiple times previously. This implies that in some embodiments the process of registration may occur quite early in the process (if there is sufficient information to do so) and in such circumstances the voxel space is pre-registered into a coordinate system. In such embodiments knowledge regarding certain voxels that are expected to be fixed (because they have surfaces that are part of a-priori known salient objects) may provide information that significantly moderates the decision process by increasing the likelihood that fixed elements (such as trees, walls, buildings, road surfaces, traffic signs and signals and so on) that are typically fixed in place remain fixed in place, whilst allowing for the possibility that some unforeseen change in the fixed salient objects in a scene may occur.

In an alternative embodiment the spectral data tolerance may be moderated based on the likelihood that from frame to frame surfaces of salient objects behave in classical fashion (they move coherently in accordance with their internal Euclidean geometry—that is they don't break apart and/or are rigid bodies) and potentially they behave according to the laws of physics. This physical smoothness constraint provides additional information in determining voxels and may accelerate the process and improve its reliability.

In an alternative embodiment the spectral data tolerance may be moderated based on the spectral data likelihood determined for neighbouring voxels.

Following Evaluate Similarity 640 control moves to the step More Cameras? 645. If there are more camera images to iterate through then the process continues to Select Next Camera Image 660 where an image from the next camera in the camera array 110 is selected and then continues on to step 635. Alternatively, if images from cameras in the camera array have been evaluated then the process moves to Update Voxel 655.

At step Update Voxel 655 the votes accumulated for a camera image are reviewed. If the maximum number of recorded votes is below a threshold, then the voxel is considered empty space or hidden by some foreground object. The internal representation of the voxel is then updated with the state Empty and a null is recorded for the representative spectral data. If the maximum number of recorded votes is equal of exceeds the threshold, then the voxel is considered to contain an observable surface and the internal representation of the voxel is updated to have a state of Occupied and its spectral data is copied from the geometric median of the pixels from the constituent camera images. In some embodiments, alternative ways (i.e., not simply the geometric median) of selecting summary spectral data (i.e., colour and/or optic flow information) from the plurality of spectral data contributed by the separate spectral data measures from different camera images may be used.

In an alternative embodiment the step Evaluate Similarity 640 calculates a probability that a voxel contains a surface and step Update Voxel 655 applies a threshold to the probability to determine the voxel state as occupied or unoccupied.

From Update Voxel 655 the process moves to More Voxels? 665 and if there are more voxels to be processed then proceeds to Select Next Voxel 670 where the next voxel to be evaluated is identified. However, if the voxels have been processed then control moves to 690 and the end of the voxel evaluation 560 process.

In another embodiment processing may be performed on raw images without de-Bayering and similarity testing may be performed using raw image data.

In another embodiment the images may be in raw format that has not been de-Bayered. The pre-calculated mapping and weighting may be made on a per channel basis as one or more, or each, channel of the spectral data sample is spatially shifted. And the Evaluate Pixel step may be performed calculating the representative spectral value for one or more, or each, spectral channel separately.

In another embodiment image and pixel similarity testing may be performed in colour space such as YUV, YCbCr, HSV.

In another embodiment a special Bayer filter may be used that enables high discrimination of elements in the scene while maximising captured light.

In another embodiment a collection of neighbouring pixels with separate spectral response characteristics (allowing for a single or multiple valued response across the spectrum of electromagnetic radiation incident on the sensor element) may collectively be considered to produce a spectral response with individual responses being stacked together to form a larger vector of spectral information, and this total response characteristic being used as the basis for determining similarity between image regions.

In another embodiment images may be encoded by Discrete Cosine Transform for Discrete Wavelet Transform and processing and similarity tests are performed on the encoded data.

In another embodiment, multiple simultaneous frames, that is multiple sets of images captured at different successive times, may be processed together to determine the voxel status. This provides an additional set of image data for the determination of the voxel status and reduces the impact of noise. For example, processing relatively static scenes where the camera array is moving, this technique provides a way to capture many more images of a scene without needing additional cameras in the array. In Get Images 530 additional sets of images are captured from the array camera 110. It is useful to know the relative change in pose (location and orientation) of the camera array at the capture times. Typically, visual methods of generating odometry may be used such as optical flow or synchronous tracking and mapping algorithms. Alternatively, data from gyro sensors and vehicle odometry may be used. Continuing on to the step Evaluate Similarity 640, the captured images are processed but with the mapping and weighting of pixels determined considering the relative change in camera position between successive camera captures.

Exemplary 3D Point Merging

Figure 7:
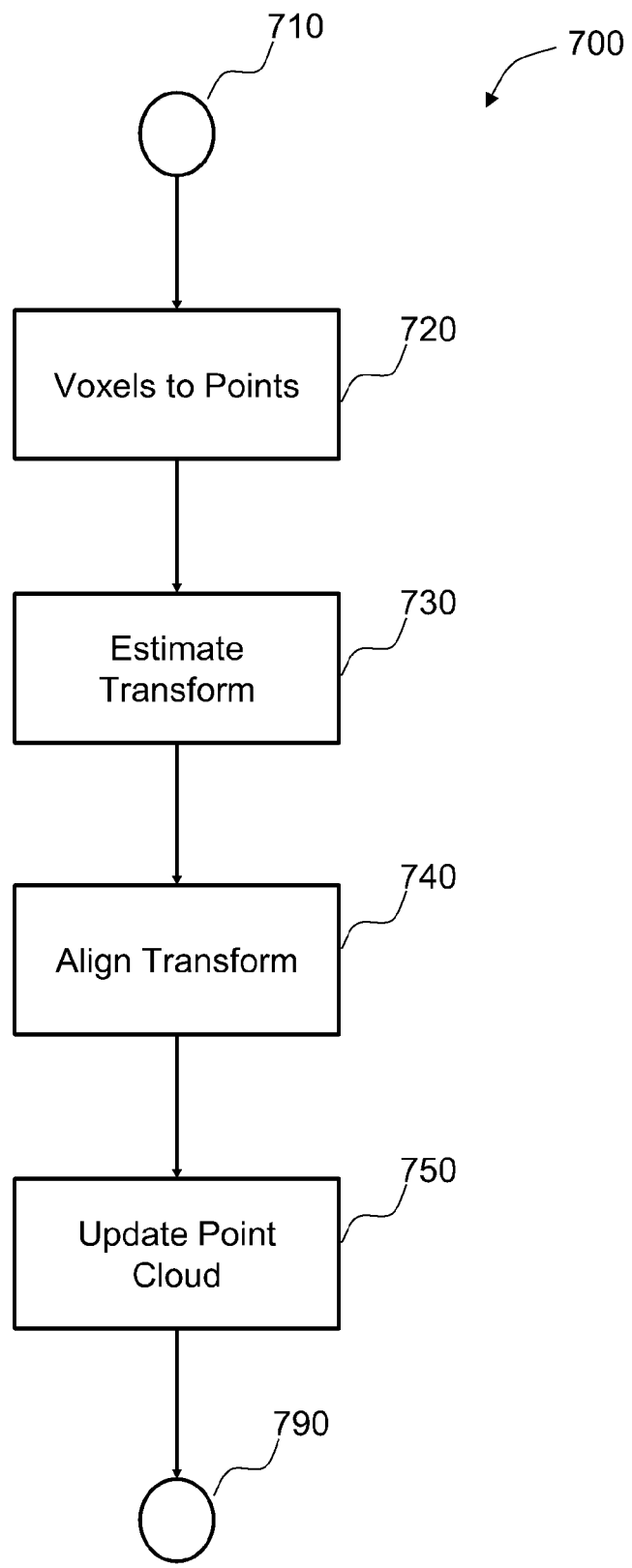
FIG. 7 is a flowchart of the 3D Point Merging process, according to certain embodiments.

Now returning to the detail of the step 3D Point Merging 570 refer to in FIG. 7.

Beginning at 710 the process moves to the step voxels to points 720. In this step the internal representation of voxels may processed and for every voxel with a state of occupied a record of a new 3D point may be made including one or more of the following: its 3D location relative to the camera array 110, its spectral data taken from the voxel and other associated metadata that may be determined. Other associated metadata may include one or more of the following: the confidence of the voxel state, grouping information, and timestamps. Determining the 3D location of the new 3D point may be performed using known transforms based on the known intrinsic and extrinsic parameters of the cameras in the camera array 110 and the known relationship to the voxels in the voxel space. Thus, from voxels to points 720 a set of new 3D points may be determined in space. These points are relative to the location of the camera array 110 as of the time that the images were captured.

From step voxels to points 720 the process moves to estimate transform 730. In this step and the following step align transform 740 a transform may be determined that normalises and aligns the new 3D points determined by step voxels to points 720 with the stored 3D point cloud data in an aggregated point cloud. This may include a change to the frame-of-reference for the new 3D points.

In the estimate shift 730 step the required transform may be estimated using available information about the movement of the camera array 110. In some embodiments, location data from GPS and/or 5G service may be used. Alternatively, data from gyro sensors and/or vehicle odometry may be used. Alternatively, visual methods of generating odometry may be used such as optical flow and/or synchronous tracking and mapping algorithms.

Following estimate transform 730 the process moves to align transform 740. In this step the new 3D point data is further normalised by optimally scaling and aligning new 3D point data with stored 3D point cloud data in an aggregated point cloud. A sample of points from the new 3D point data may be associated with closest points in the aggregated point cloud and an aggregated distance metric may be computed for associated points. Transformation parameters may be estimated that reduce the aggregated distance metric and the transformation is applied to the new 3D point data. Constraints on transformation parameter estimation (including such items as vehicle speed and trajectory) may be applied to reduce computational complexity. This processing is repeated within real time constraints for application to vehicle navigation decisions and may be further repeated beyond real time constraints for subsequent application to improve an aggregated point cloud.

Following align transform 740 the process moves to update point cloud 750. In this step the new 3D points may be integrated with the existing aggregated point cloud data. New 3D points are checked for matches with points in the aggregated point cloud on the basis of one or more of the following: 3D location, spectral data, optic flow data, and other metadata. If a new point is matched, then the matched point in the stored 3D point data may be updated. If no match is found, then a new 3D point may be added to the stored 3D point cloud.

In certain embodiments, 3D points that have been associated with a salient object moving relative to the scene are not added to the aggregated point cloud stored 3D point cloud.

Figure 8A:
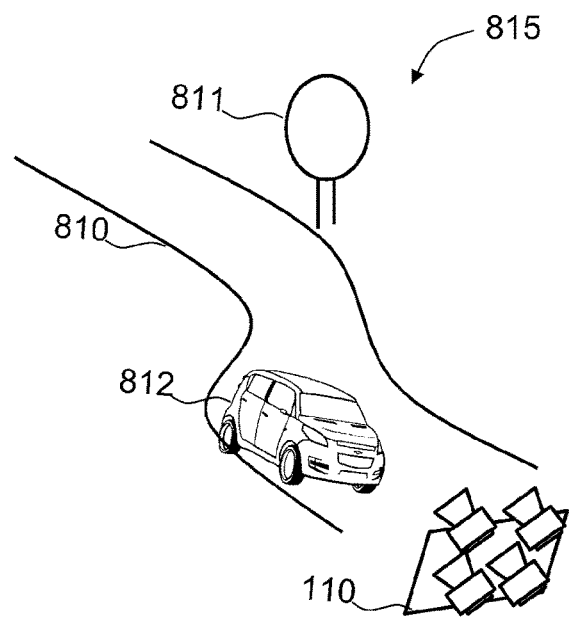
FIG. 8 is an illustration of voxels, the 3D point cloud and aggregated point cloud, according to certain embodiments.
Figure 8B:
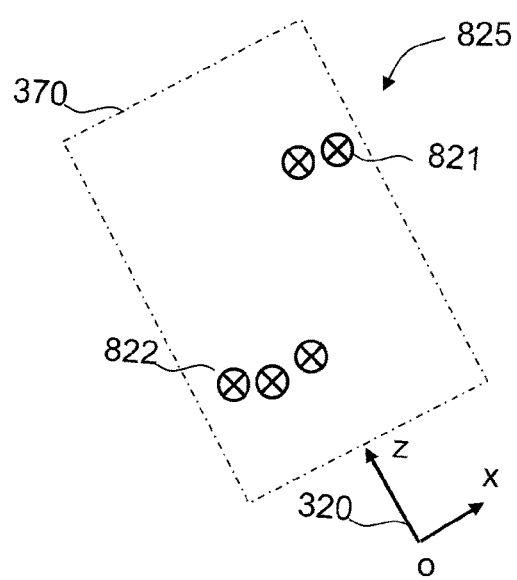
Figure 8C:
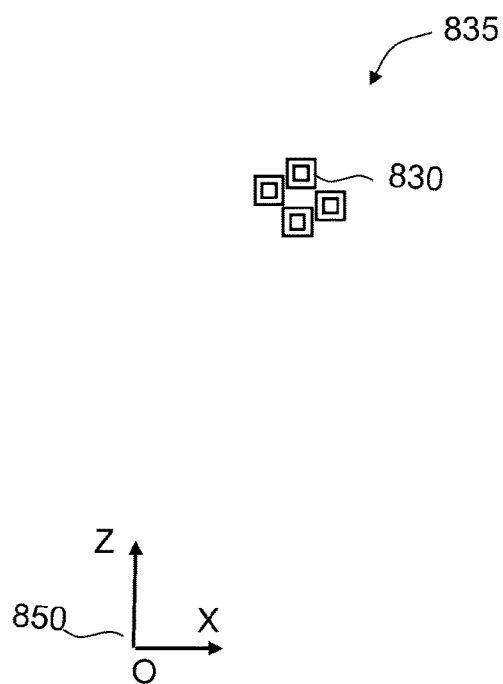
Figure 8D:
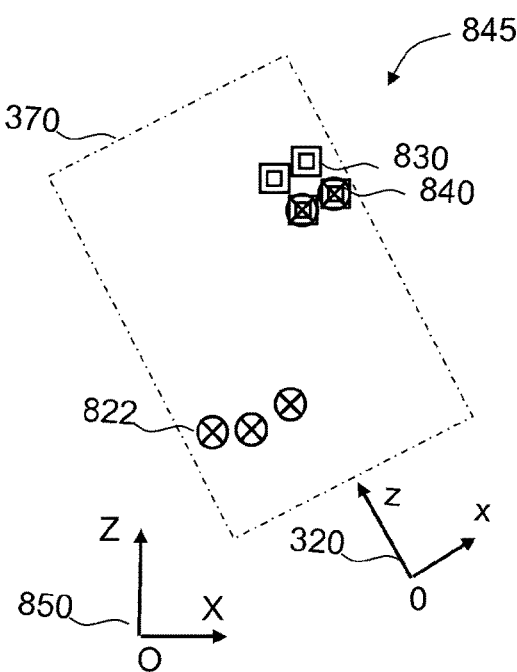

FIG. 8A illustrates a scene 815 including a tree 811 that is stationary, a road 810, a car 812 that is moving and also indicates a camera array 110. As the camera array 110 moves through the scene 815 new 3D points are determined as previously described in step voxels to Points 720 and as shown in FIG. 8B. In FIG. 8B a frame of reference 320 is indicated as is the voxel space 370 and new 3D points as indicated at 822 corresponding to the detection of surfaces on the car 812 and other new 3D points as indicated at 821 corresponding to surfaces on the tree 811. FIG. 8C illustrates a prior aggregated point cloud, with its frame of reference indicated at 850 and some 3D points at 830 corresponding to the tree 811. In FIG. 8D the result of step Update point cloud 750 is shown, an aggregated point cloud 845 is shown with the frames of reference 320, and 850 both indicating that the transform between the two frames of reference is known. Additionally, 3D points 840 have been updated with information from the new 3D Point data. Notably in this illustration new 3D Point data indicated by 822 has not been added to the aggregated point cloud as it is associated with a moving salient object, in this case car 812, that is moving relative to the scene 815.

As the camera array moves through the scene new 3D points may be added to the aggregated point cloud and thus the aggregated point cloud grows to cover more of the scene. Additionally, new 3D points may lie between existing 3D points in the aggregated point cloud and thus the density of 3D points in the aggregated point cloud increases. A defined limit on the density of the aggregated point cloud determines whether down-sampling should be applied.

In certain embodiments, additional camera arrays may be positioned in various directions and with various orientations around a vehicle. For example, additional camera arrays may be directed to the sides of the vehicle or to the rear of the vehicle.

Figure 9A:
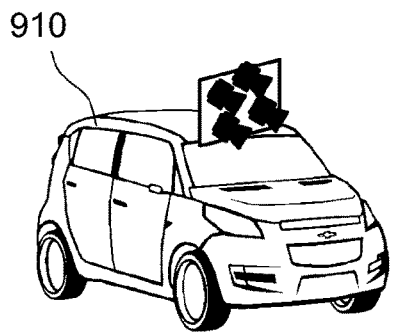
FIG. 9 is an illustration of exemplary vehicles and possible camera array configurations, according to certain embodiments.
Figure 9B:
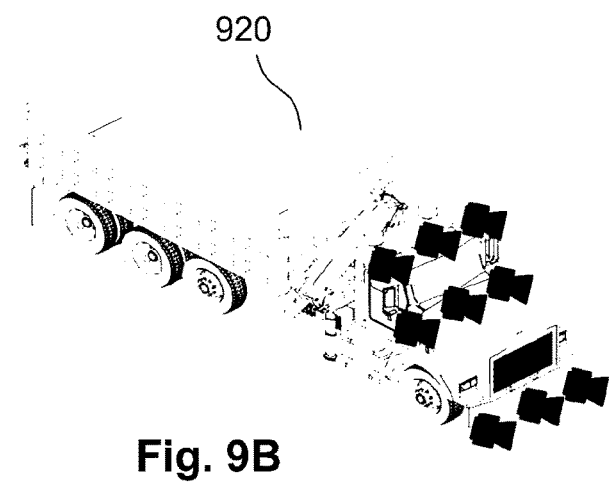
Figure 9C:
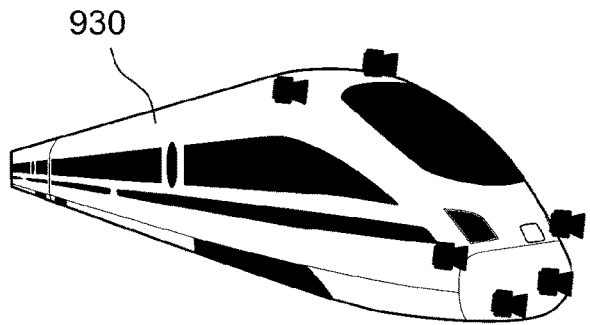
Figure 9D:
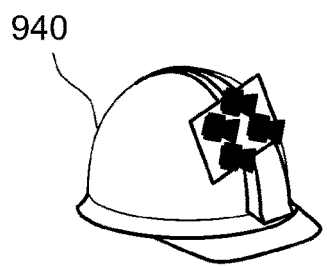
Figure 9E:
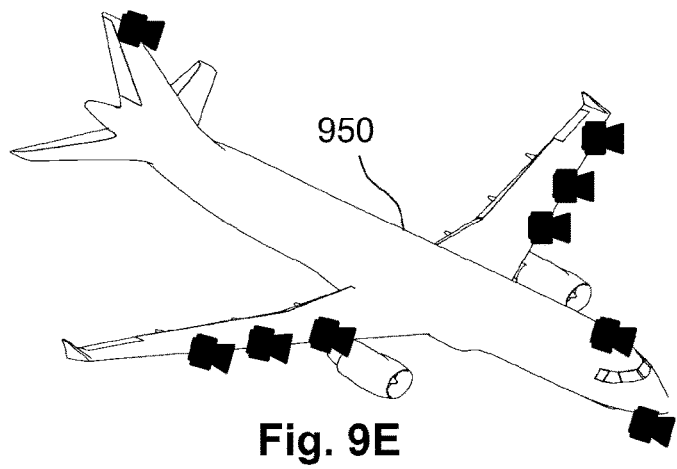

FIG. 9A shows a vehicle 910, in this case a car with a camera array positioned above the windscreen. FIG. 9B shows a truck 920 with a set of cameras positioned about the bonnet and cabin of the truck forming a camera array. FIG. 9C shows a train 930 with a set of cameras positioned about the forward aspect of the train forming a camera array. FIG. 9D shows a safety helmet with a camera array positioned at the front of the helmet. FIG. 9E shows an aeroplane with cameras positioned along the wings, on the tail and at the front of the aircraft, the cameras forming a camera array.

Figure 10A:
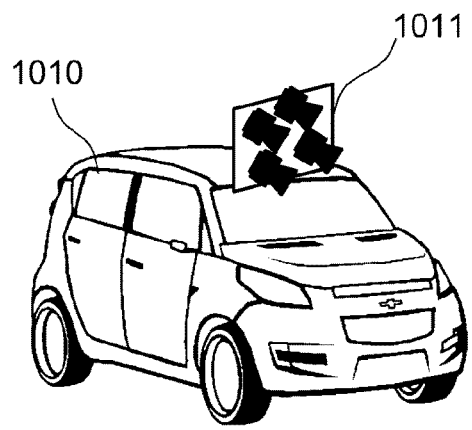
FIG. 10 is an illustration of further exemplary camera configurations, according to certain embodiments.
Figure 10B:
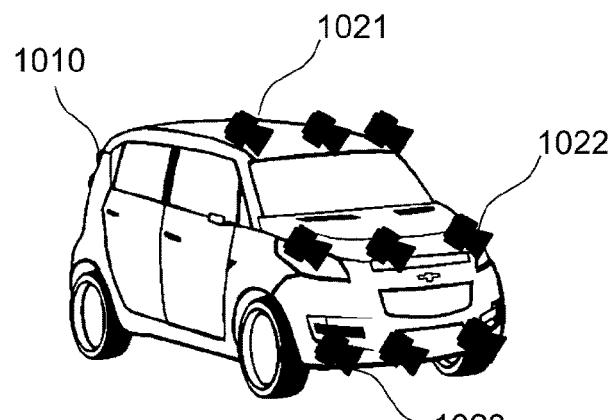
Figure 10C:
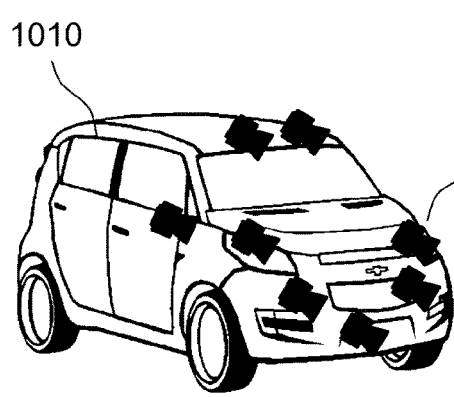
Figure 10D:
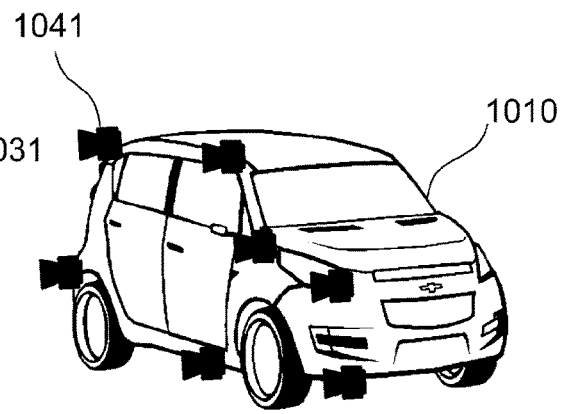
Figure 10E:
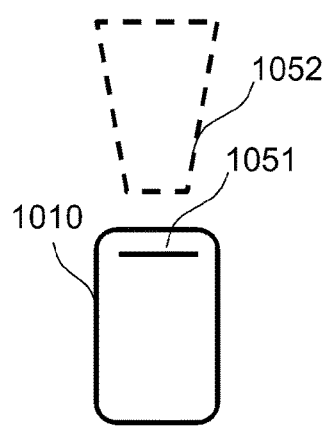
Figure 10F:
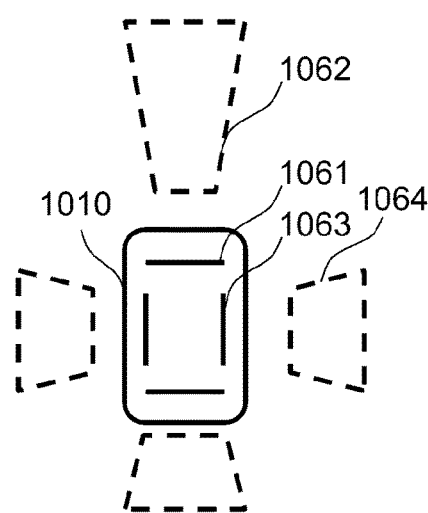
Figure 10G:
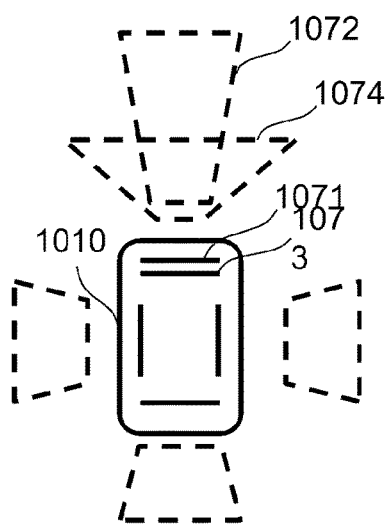

FIG. 10A shows again a car 1010 with a camera array 1011 positioned above the windscreen. FIG. 10B shows an alternative configuration with car 1010 and cameras such as 1021, 1022 positioned about the front of the car in an approximate grid formation forming a camera array. FIG. 10C shows an alternative configuration with car 1010 and cameras such as 1031 positioned about the front of the car positioned to be convenient considering the car design and manufacturing constraints and without being an approximate grid, forming a camera array. It may be convenient to place cameras into existing components of the car, for example, the headlights, the side mirrors and/or behind the windscreen. FIG. 10D shows an alternative configuration with car 1010 and cameras such as 1041 positioned on the side of the car and forming a camera array. FIG. 10E shows a top down view of a car 1010 and a camera array 1051 and indication of the observed region 1052. FIG. 10F shows a top down view of a car 1010 and four camera arrays including 1061, 1062 positioned on the front, back, left and right aspects of the car and shows the observed region including 1062 and 1064. FIG. 10G shows a top down view of a car 1010 with a camera array 1071 and the observed region 1072 and a second camera array 1073 and its observed region 1074 having a different coverage from 1072.

FIG. 13 shows a simulated image of a road scene at 1310 (FIG. 13A). Using 4 such images of the simulated road scene, each taken from a different position, the 3D scene information illustrated at 1320 (FIG. 13B) was generated. The lack of definition in the foliage of the trees and the poor definition around the car in the foreground contrast with the result in 1330 (FIG. 13C) generated using 16 images of the simulated road scene. In 1330 the definition around the foreground car is improved as is the definition of the tree foliage.

In FIG. 14 at 1410 (FIG. 14A) is shown another simulated image of a road scene, in this case with more realistic textures. Using 15 such images of the simulated road scene, each taken from a different position, the 3D scene information illustrated at 1420 (FIG. 14B) was generated. The use of robust statistical estimators has enabled the noise evident in the example of FIG. 13 to be eliminated with good definition in the 3D scene information of the car, the trees, and the fine foliage of the trees. Thus, the effectiveness of the method when used with a sufficient number of camera views is demonstrated.

Analysis of a video captured of road scene (not shown) was used to validate the assertion that having multiple camera views would improve the quality of the 3D scene information. Analysis showed that in this dataset a stereo camera configuration found 40% of pixels had another matching pixel at 100 or less pixels away implying a high level of ambiguity if only 2 images were used (i.e., conventional stereo system). In contrast, a method drawing on data from 15 cameras had near zero matching pixels at the same distance, thus indicating that much of the ambiguity may be avoided if more images of the scene were taken and robust statistical measures were then possible (such measures, such as the Median, are only possible with 3 or more independent measurements and become generally effective with 5 or more).

In FIG. 14 at 1440 (FIG. 14D) is shown an example of a result of the method generated from a set of 16 digital photographs simulating the system operating with a camera array of 16 cameras. At 1430 (FIG. 14C) is shown one of the 16 digital photographs. At 1440 is an image captured from software displaying a view of the generated 3D scene information that has been generated using the method and showing the same scene but from a different perspective. As seen in 1440, the car and surrounding bushes appear to rise above the ground, which is flat and planar, thus we may observe that depth information about the scene has been correctly captured. Notice also that there are no opaque voxels floating in free space indicating that the method has correctly suppressed spurious spectral matches that may have occurred between some locations in some images.

The processing engines for the respective camera arrays may contribute 3D points to a common aggregated point cloud so that knowledge of the scene is built up and/or maintained continuously. In certain embodiments, the cameras on a single array may be configured to be angled dynamically to control their combined area of resolution in the scene—focusing their pixels on volumes close to or, alternatively, far away from the array. Such dynamic movements may be used to adjust the resolution distance of the array in response to the overall speed the vehicle on which the array is attached is travelling.

In certain embodiments, the 3D point cloud takes the initial position of the camera array as the origin point and orientation for its frame-of-reference.

In certain embodiments, the frame-of-reference used may be based on a global position reference acquired from GPS or 5G data and this enables one or more of the following: external sources of 3D point data, map data, knowledge of the road, knowledge of landmarks, knowledge of reference objects for calibration updates, accurate satellite imagery, and so on to be integrated into the system.

In certain embodiments, scene knowledge including 3D point cloud data, object data and/or other scene information may be transmitted from the system to an external repository of scene data. This data may be shared with other vehicles providing them with advance knowledge of a 3D scene. The accumulated knowledge may be used for other purposes including one or more of the following: assisting in route planning, assisting infrastructure planning authorities and monitoring the environment over time. In certain embodiments, the scene knowledge may be transmitted through a peer to peer networking to nearby vehicles.

Considering again FIG. 3, the scene 300 contains stationary elements including the road 310, trees 340, 350 and a sign 360. For these elements of the scene 3D point cloud data may be consistent with the previously captured 3D point cloud data. Other elements of the scene 300 such as the cars 320, 330 may be moving.

3D points associated with these elements may be shifted relative to those of stationary elements. An object point set consists of a set of localised 3D points observed to move with a common direction and speed as a salient object. The common motion of points in the salient object distinguishes the point set from other 3D points mapping the scene. The 3D points, belonging to a salient object form a probabilistic shape approximating a corresponding object in the scene.

Other cues may be used to inform grouping of 3D points in a salient object including one or more of the following: spectral data similarities between neighbouring 3D points, the motion of 3D points matched from frame to frame, object shape, spectral data profile and trajectories estimated from previous observations.

This stream of data regarding salient objects may then be made available to either decision systems (that calculate optimal trajectories, way-paths and collision avoidance) or to immersion systems (where the unfolding scene is viewed by humans or machines as a navigable 3D scene).

In certain embodiments, predicted trajectories of tracked elements may be used to predict voxels occupied by the tracked object as a prior data point that may be integrated into the decision making processes of the voxel evaluation 560.

In certain embodiments, previously captured voxel data or previously determined aggregated point cloud data may be used to support the decision making processes of the voxel evaluation 560 by temporal filtering over a series of observations in time, or by providing a prior probability for the occupation of a voxel.

In certain embodiments, 3D point clouds may be further aligned by real time localization, where the reference point of the camera array may be determined within a reference structure so that instead of a relative 3D point cloud the system provides a 3D point cloud in an arbitrary frame of reference point that also locates the camera array itself in the 3D point cloud. Prior 3D point cloud data or image data from prior runs of the camera array on the same scene or from 3D point clouds derived from 3rd parties or 3D maps of the area derived from 3rd parties are then able to be integrated.

3D point clouds represent a single moment of time (strictly during a relatively static time period) captured using one camera array. 3D point clouds are analogous to a single image frame of 2D video. In certain embodiments, a 3D point cloud may be captured in real time along with metadata including location and/or orientation. Location and/or orientation may be computed from GPS, accelerometer, gyroscope events or combinations thereof. After capturing, 3D point clouds may be used for real time, or substantially real time, decisions. The 3D point clouds may be queued for additional processing (for example, during car idle and/or stationary time) such as registration refinement where additional metadata may be subsequently added including, for example, layering of one or more refinement parameters.

In certain embodiments, 3D point clouds may be captured using multiple camera arrays at the same Relatively Static Time, or substantially the same Relatively Static Time, and their point clouds combined. This is different to aggregated point cloud, which combines point clouds captured at different times.

A sequence of 3D point clouds is a 3D point cloud Video. 3D point cloud Video may be viewed in forwards or reverse sequence. Additionally, 3D point cloud Video may be viewed from different viewpoints with movement along six degrees of freedom. Additionally, multiple 3D point clouds may be viewed simultaneously in real time aligned using precomputed position orientation metadata and/or refinement parameters.

Storage of many point clouds for 3D point cloud Video may require use of spatial and/or temporal compression techniques.

Further advantages of the claimed subject matter will become apparent from the following examples describing certain embodiments of the claimed subject matter.

1A. Example 1A. A system for generating three-dimensional video streams with accurate depth estimates using camera arrays comprising: at least one camera array consisting of multiple cameras (at least 4, 5, 6, 8, 10, 12, 14, or 16 cameras) where at least a substantial portion the cameras comprises a sensor sensitive to the electromagnetic spectrum and is mounted in an approximately fixed and known position in the array; a mechanism that ensures that at least a substantial portion of the cameras in the array takes its frame shot at the same time (or substantially the same time) as the other cameras in the array; and an image processing system that takes the plurality images (or a substantial portion of the plurality of images) from cameras in the array and computes: a normalization that aligns each image (or a substantial portion of the images); a set of voxels that comprise the 3D scene (or a portion of the 3D scene; a voxel depth calculation that determines the probability of each voxel (or a substantial portion of the voxels) being occupied at a particular 3D position in space; and an output from the image processing system that produces a 3D depth map (or 3D point cloud) frame by frame for the scene that consists of a probability for each voxel (or a substantial portion of the voxels) of being occupied and optionally other data.

2A. The system of example 1, wherein the image processing system computes a further image processing step whereby the voxels are associated together in groups to form probabilistic surfaces of named features in the scene at each point in time (or a substantial portion of the points); and an output from the image processing system including the association of pixels into groups that comprise probabilistic surfaces in the scene.

3A. The system of examples 1A or 2A, wherein the camera is sensitive in the visual spectrum and/or the infra-red spectrum and/or the ultra violet spectrum and where the particular spectrum sensitivity may vary between cameras in the array; and an output from the image processing system where the colour values are in a colour space in the visual spectrum and/or the infra-red spectrum and/or the ultra violet spectrum.

4A. The system of any of examples 1A to 3A, wherein the cameras in the array may not be aligned in a single plane, but rather be offset at fixed positions in any or all of the 3 dimensions.

5A. The system of any of examples 1A to 4A, wherein an voxel occupancy calculation uses a method that comprises: back-projection of voxel faces to aligned images in the 2D sensor space of each camera (or a substantial portions of the cameras); a calculation of the agreement of the spectral response (colour) of the back projection of each voxel (or a substantial portion of the voxels) across two or more of the camera images; and a probability determination, based on the agreement calculation, that the voxel at a particular depth in the scene is occupied by a solid object of that spectral response.

6A. The system of example 5A, wherein the calculation of an agreement includes calculation of a robust statistical estimation across the spectral response from five or more camera images.

7A. The system of any of examples 1A to 6A, wherein the probability determination includes information from neighbouring voxels to assist in the calculation particularly marking voxels behind the target voxel as occluded as viewed from a specific camera, and marking voxels in front of the target voxel as transparent.

8A. The system of any of examples 1A to 7A, wherein the probability determination includes information regarding a previously identified object or cluster of points in prior frames that is within the neighbourhood of the voxel.

9A. The system of any of examples 1A to 8A, wherein the size of the voxel may be adjusted to improve the reliability of the probability calculation, either by increasing or decreasing the voxel width, height, and/or depth.

10A. The system of any of examples 1A to 9A, wherein the agreement calculation uses a combination of spectral and spatial measures.

11A. The system of any of examples 1A to 10A, wherein the agreement calculation uses a combination of spectral and spatial characteristics of the sensor elements.

12A. The system of any of examples 1A to 11A, wherein the agreement calculation uses a combination of spectral measures and apparent image motion measures.

13A. The system of any of examples 1A to 12A, wherein the voxel occupancy calculation comprises: a reverse projection from a voxel face into each normalized camera image or a substantial portion of normalized camera images; a comparison of the spectra in each such projection (or a substantial portion of such projections); an analysis of the spectral variability across each camera (or a substantial portion of cameras) for the projection; a probability assessment, based on the spectral variability across projections, as to the likelihood that the observed spectra emanated from a voxel at the depth of the source voxel face; and an assignment of a depth probability to the source voxel that specifies the probability that it is occupied by a physical surface at that depth.

14A. The system of any of examples 1A to 13A, wherein the source voxel size is varied to improve the reliability of the depth probability.

15A. The system of any of examples 1A to 14A, wherein the camera array is moving over time and then incorporating each frame of images (or a substantial portion of the frames of the images) as if they were an additional camera array observing the scene, thereby doubling, tripling etc. the effective number of sensors used in the calculation.

16A. The system of any of examples 1A to 15A, wherein previously calculated voxels are aligned with currently calculated set of voxels and the previous voxels assist in calculating the probability of the current voxels.

17A. The system of any of examples 1A to 16A, wherein portions of camera images that are substantially identical are designated as occurring at the infinity plane and wherein projections are removed from calculations based on the portions of camera images that are designated as occurring at the infinity plane.

18A. The system of any of examples 1A to 17A, wherein matrices of mappings of voxels to pixel locations in each sensor (or a substantial portion of sensors) are precomputed and used as a lookup table to reduce the processing time of the system.

19A. The system of any of examples 1A to 18A, wherein pixel mappings for lens un-distortion are included or incorporated in the precomputed lookup table.

20A. The system of any of examples 1A to 19A, wherein real time processing occurs within time constraints and additional processing occurs whilst the vehicle is idle or stationary.

21A. The system of any of examples 1A to 20A, wherein the cameras in the Array are able to be moved (translated and/or rotated) within the Array under the command of a computer decision system such that the orientation of the cameras is optimised with respect to various quality target metrics.

22A. The system of any of examples 1A to 21A, wherein quality target metric is the requirement to direct the camera pixel Arrays such that their measurement accuracy is optimised for a particular distance in front of the Array.

23A. A method for generating three-dimensional video streams with accurate depth estimates using of any of the systems in examples 1A to 22A.

1B. A system that is capable of (or configured to produce) producing a voxel space comprising: a camera array; a processing engine that is capable of (or configured to receive): receiving spectral data collected from the camera array; using the collected spectral data at least in part to generate a voxel space by determining one or more probabilities that a portion of a scene is occupied by a surface; wherein the voxel space is representative of a physical space.

2B. A system that is capable of producing (or configured to produce) a voxel space comprising: a camera array made up of a plurality of cameras; the plurality of cameras comprising two or more cameras that are capable of (or configured for) spectral data collection from two or more field of views of a scene; a processing engine that is capable of (or configured to): receiving spectral data collected from the camera array; using the collected spectral data at least in part to generate the voxel space that comprises a plurality of voxels by determining for one or more voxels of the plurality of voxels one or more probabilities that a portion of the scene represented by the one or more voxels is occupied by a surface; aggregating the portion of the scene into a plurality of scenes to generate the voxel space; wherein the voxel space is representative of a physical space based at least in part on spectral data collected from the two or more field of views.

3B. A system that is capable of (or configured to produce) producing a plurality of voxels comprising: a camera array made up of a plurality of cameras; the plurality of cameras comprising two or more cameras that are capable of (or configured for) spectral data collection from two or more field of views of a scene; a processing engine that is capable of (or configured to): receiving spectral data collected from the camera array; using the collected spectral data at least in part to generate the plurality of voxels by determining for one or more voxels of the plurality of voxels one or more probabilities that a portion of the scene represented by the one or more voxels is occupied by a surface; aggregating the portion of the scene into a plurality of scenes to generate the plurality of voxels; wherein the plurality of voxels is representative of a physical space based at least in part spectral data collected from the two or more field of views.

4B. The systems of any of examples 1B to 3B, wherein the camera array is made up of a plurality of cameras.

5B. The systems of any of examples 1B to 4B, wherein the plurality of cameras comprising two or more cameras that are capable of (or configured for) spectral data collection from two or more field of views of a scene.

6B. The systems of any of examples 1B to 5B, wherein the processing engine is capable of (or configured to aggregate) aggregating the portion of the scene into a plurality of scenes to generate the voxel space.

7B. The systems of any of examples 1B to 6B, wherein the two or more field of views of the two or more cameras overlaps at least in part.

8B. The systems of any of examples 1B to 7B, wherein the spectral data includes one or more spectral signals.

9B. The systems of any of examples 1B to 8B, wherein the one or more spectral signals includes one or more transparency values.

10B. The systems of any of examples 1B to 9B, wherein the processing engine is capable of (or configured to use) using at least in part one or more spectral signals to produce one or more spectral values.

11B. The systems of one or more of examples 1B to 10B, wherein the camera array is made up of a plurality of cameras and the plurality of cameras comprise at least 4 cameras.

12B. The systems of any of examples 1B to 11B, wherein the plurality of cameras are configured to a fixed and known position in the camera array.

13B. The systems of any of examples 1B to 12B, wherein the camera array is configured such that at least two cameras in the camera array take an image containing spectral data of at least a portion of the scene at substantially the same time or at the same time.

14B. The systems of any of examples 1B to 13B, wherein a substantial portion of the cameras in the camera array are configured to take an image containing spectral data of at least a portion of the scene at substantially the same time or at the same time.

15B. The systems of any of examples 1B to 14B, wherein each camera in the camera array is configured to take an image containing spectral data of at least a portion of the scene at substantially the same time or at the same time as the other cameras in the camera array.

16B. The systems of any of examples 1B to 15B, wherein at least two or more cameras in the camera array are configured to take a plurality of images contain spectral data of at least a portion of the scene within a relatively static time period, wherein the time period is between 0.01 seconds and 1 second.

17B. The systems of any of examples 1B to 16B, wherein the at least two or more cameras in the camera array are configured to have a simultaneous frames count of between 2 to 16 within the relatively static time period.

18B. The systems of any of examples 1B to 17B, wherein the at least two or more cameras in the camera array are configured to have a multiple simultaneous frames count of between 2 to 4 within the relatively static time period.

19B. The systems of any of examples 1B to 18B, wherein the plurality of cameras are configured to collect spectral data in one or more of the following: visual spectrum, infrared spectrum, and ultra violet spectrum.

20B. The systems of any of examples 1B to 19B, wherein spectrum sensitivity of the plurality of cameras is not the same for at least one camera in the plurality of cameras.

21B. The systems of any of examples 1B to 20B, wherein the plurality of cameras in the camera array have a substantial planar alignment.

22B. The systems of any of examples 1B to 21B, wherein the plurality of cameras in the camera array have a non-planar alignment.

23B. The systems of any of examples 1B to 22B, wherein the processing engine is configured to calculate a voxel occupancy using a method that comprises: back-projection of one or more voxel faces to aligned collected spectral data in the 2D sensor space of one or more cameras; a calculation of an agreement of the spectral response of a back projection of one or more voxels across two or more of the spectral data collected; a probability determination, based on the calculation of the agreement, that a particular voxel of the one or more voxels at a particular depth in the scene is occupied by a solid object of that spectral response.

24B. The system of example 23B, wherein the calculation of an agreement includes calculation of a robust statistical estimation across the spectral response from five or more camera images.

25B. The systems of any of examples 1B to 24B, wherein the one or more probabilities determinations for a particular voxel of the one or more voxels further comprises information from one or more neighboring voxels, wherein the information indicates that the one or more neighboring voxels is occluded or transparent.

26B. The systems of any of examples 1B to 25B, wherein the one or more probabilities determinations for a particular voxel of the one or more voxels further comprises information regarding a previously identified object or cluster of points in prior collected spectral data from the one or more neighboring voxels.

27B. The systems of any of examples 1B to 26B, wherein the processing engine is capable of (or configured to) adjusting the size of the voxel in order to alter the one or more probabilities determinations by doing one or more of the following: increasing or decreasing voxel width, increasing or decreasing voxel height, and increasing or decreasing voxel depth.

28B. The systems of any of examples 1B to 27B, wherein the agreement calculation uses a combination of spectral and spatial measures.

29B. The systems of any of examples 1B to 28B, wherein the voxel occupancy calculation comprises: a reverse projection from at least one voxel face into at least one normalized collected spectral data; a comparison of the spectra in at least one such projection; an analysis of the spectral variability across at least one camera for the projection; a probability assessment, based on the spectral variability across projections, as to the likelihood that the observed spectra emanated from at least one voxel at the depth of the at least one source voxel face; and an assignment of a depth probability to the at least one source voxel that specifies the probability that it is occupied by a physical surface at that depth.

30B. The systems of any of examples 1B to 29B, wherein previously calculated at least one voxel is aligned with currently calculated at least one voxel to assist in calculating the probability of the at least one current voxel.

31B. The systems of any of examples 1B to 30B, wherein voxel projections in two or more of the collected spectral data that are substantially identical are designated as occurring at the infinity plane and removed from calculations.

32B. The systems of any of examples 1B to 31B, wherein matrices of mappings of at least one voxel to pixel locations in at least one sensor are precomputed and used as a lookup table to reduce the processing time of the system.

33B. The systems of any of examples 1B to 32B, wherein at least one pixel mapping for at least one camera lens un-distortion is incorporated in the precomputed lookup table.

34B. The systems of any of examples 1B to 33B, wherein the plurality of cameras comprising two or more cameras that are capable of spectral data collection from five or more field of views of a scene.

35B. The systems of any of examples 1B to 33B, wherein the plurality of cameras comprising two or more cameras that are configured for spectral data collection from five or more field of views of a scene.

36B. The systems of any of examples 1B to 33B, wherein the plurality of cameras comprising five or more cameras that are capable of spectral data collection from five or more field of views of a scene.

37B. The systems of any of examples 1B to 33B, wherein the plurality of cameras comprising five or more cameras that are configured for spectral data collection from five or more field of views of a scene.

1C. A system that is capable of producing a voxel space comprising: a camera array made up of a plurality of cameras; the plurality of cameras comprising two or more cameras that are capable of spectral data collection from two or more field of views; a processing engine that is capable of: receiving spectral data from the camera array and using the spectral data at least in part to generate a plurality of voxels by determining for one or more voxels of the plurality of voxels one or more spectral signals including one or more transparency values and producing one or more spectral values; aggregating the one or more spectral values into a plurality of spectral signals to generate the voxel space; wherein the voxel space is representative of a physical space.

2C. A system that is configured to produce a voxel space comprising: a camera array made up of a plurality of cameras; the plurality of cameras comprising two or more cameras that are configured for spectral data collection from two or more field of views; a processing engine that is configured to: receive spectral data from the camera array and use the spectral data at least in part to generate a plurality of voxels by determining for one or more voxels of the plurality of voxels one or more spectral signals including one or more transparency values and producing one or more spectral values; aggregating the one or more spectral values into a plurality of spectral signals to generate the voxel space; wherein the voxel space is representative of a physical space.

3C. A system that is capable of producing a plurality of voxels comprising: a camera array made up of a plurality of cameras; the plurality of cameras comprising two or more cameras that are capable of spectral data collection from two or more field of views; a processing engine that is capable of: receiving spectral data from the camera array and using the spectral data at least in part to generate the plurality of voxels by determining for one or more voxels of the plurality of voxels one or more spectral signals including one or more transparency values and producing one or more spectral values; aggregating the one or more spectral values into a plurality of spectral signals to generate the plurality of voxels; wherein the plurality of voxels is representative of a physical space.

4C. A system that is configured to produce a plurality of voxels comprising: a camera array made up of a plurality of cameras; the plurality of cameras comprising two or more cameras that are configured for spectral data collection from two or more field of views; a processing engine that is configured to: receive spectral data from the camera array and use the spectral data at least in part to generate the plurality of voxels by determining for one or more voxels of the plurality of voxels one or more spectral signals including one or more transparency values and producing one or more spectral values; aggregated the one or more spectral values into a plurality of spectral signals to generate the plurality of voxels; wherein the plurality of voxels is representative of a physical space.

5C. A system that is capable of producing a voxel space comprising: a camera array comprising a plurality of cameras that are capable of collecting spectral data from a field of view, wherein the field of view of the plurality of cameras overlaps at least in part; a processing device that is capable of receiving spectral data collected from the camera array, the processing device is capable of converting the collected spectral data into the voxel space that comprises a plurality of voxels, and the processing device is capable of determining for one or more voxels in the plurality of voxels a spectral signal including transparency; wherein the voxel space is representative of a physical space.

6C. A system that is configured to produce a voxel space comprising: a camera array comprising a plurality of cameras that are configured for collecting spectral data from a field of view, wherein the field of view of the plurality of cameras overlaps at least in part; a processing device that is configured to receive spectral data collected from the camera array, the processing device is configured to convert the collected spectral data into the voxel space that comprises a plurality of voxels, and the processing device is configured to determine for one or more voxels in the plurality of voxels a spectral signal including transparency; wherein the voxel space is representative of a physical space.

7C. A method for generating a voxel space of a scene that is representative of a physical space comprising: arranging a camera array made up of a plurality of cameras comprising two or more cameras, the two or more cameras of the camera array are configured to collect spectral data from one or more views of the physical space; using the plurality of cameras of the camera array to collect spectral data from the one or more views of the physical space, the collected spectral data being of two or more field of views of the physical space; transferring the collected spectral data from the camera array to a processing engine, generating the scene within the processing engine by using the collected spectral data at least in part to generate a plurality of voxels by determining for one or more voxels of the plurality of voxels one or more probabilities that a portion of the scene represented by the one or more voxels is occupied by a surface; and aggregating the plurality of voxels into the voxel space; wherein the voxel space of the scene is representative of a physical space based at least in part on spectral data collected from the two or more field of views.

8C. A system that is capable of generating a three-dimensional streaming voxel space that is representative of a physical space comprising: a camera array made up of a plurality of cameras; the plurality of cameras comprising two or more cameras that are capable of spectral data collection from two or more field of views of a scene, wherein at least one camera is mounted in a known position within the camera array; the camera array is configured such that at least a first camera collects at least a first set of spectral data and at least a second camera collects at least a second set of spectral data at substantially the same time; a processing engine that is capable of: receiving the at least first set of spectral data and the at least second set of spectral data from the camera array; m performing a normalization that aligns the at least first set of spectral data and the at least second set of spectral data to produce at least one aligned set of spectral data; using the at least one aligned set of spectral data at least in part to generate at least one voxel space by determining for one or more voxels of the voxel space one or more depth calculations to determine at least in part a probability that one or more voxels occupies a particular three-dimensional position in the at least one voxel space; aggregating the at least one voxel space into a plurality of voxel spaces and using the plurality of voxels spaces to generate the three-dimensional streaming voxel space; wherein the three-dimensional streaming voxel space is a frame by frame three-dimensional representation of the physical space.

9C. A system that is configured to generate a three-dimensional streaming voxel space that is representative of a physical space comprising: a camera array made up of a plurality of cameras; the plurality of cameras comprising two or more cameras that are configured for spectral data collection from two or more field of views of a scene, wherein at least one camera is mounted in a known position within the camera array; the camera array is configured such that at least a first camera collects at least a first set of spectral data and at least a second camera collects at least a second set of spectral data at substantially the same time; a processing engine that is configured to: receive the at least first set of spectral data and the at least second set of spectral data from the camera array; perform a normalization that aligns the at least first set of spectral data and the at least second set of spectral data to produce at least one aligned set of spectral data; use the at least one aligned set of spectral data at least in part to generate at least one voxel space by determining for one or more voxels of the voxel space one or more depth calculations to determine at least in part a probability that one or more voxels occupies a particular three-dimensional position in the at least one voxel space; aggregating the at least one voxel space into a plurality of voxel spaces and using the plurality of voxels spaces to generate the three-dimensional streaming voxel space; wherein the three-dimensional streaming voxel space is a frame by frame three-dimensional representation of the physical space.

Any description of prior art documents herein, or statements herein derived from or based on those documents, is not an admission that the documents or derived statements are part of the common general knowledge of the relevant art.

While certain embodiments have been shown and described herein, it will be obvious to those skilled in the art that such embodiments are provided by way of example only.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It is to be understood that the present disclosure is not limited to the disclosed embodiments, and is intended to cover various modifications and equivalent arrangements included within the spirit and scope of the present disclosure. Also, the various embodiments described above may be implemented in conjunction with other embodiments, e.g., aspects of one embodiment may be combined with aspects of another embodiment to realize yet other embodiments. Further, independent features of a given embodiment may constitute an additional embodiment.

What is claimed is:

1. A system that is configured to produce a 3D point cloud representing surfaces in a physical scene comprising:
    a camera array made up of a plurality of cameras, the plurality of cameras comprising at least four cameras that are configured for spectral data collection from at least four fields of view of the physical scene,
    wherein the at least four fields of view, of the at least four cameras, overlap at least in part, and
    wherein the at least four cameras of the plurality of cameras are configured to a fixed and known position in the camera array; and
    a processing engine that is configured to:
        receive spectral data from the camera array while the camera array is moving forward through the physical scene, wherein the camera array is moving forward along a path in the physical scene in a first direction relative to the physical scene; and
        use the spectral data at least in part to generate the 3D point cloud representing surfaces in the physical scene by selecting one or more voxels of a plurality of voxels based on one or more calculated probabilities that the one or more voxels are likely to be occupied by a surface in the physical scene, wherein at least one of the one or more calculated probabilities is based on comparison of first spectral data received from a first camera among the plurality of cameras and second spectral data received from a second camera among the plurality of cameras;
    wherein the 3D point cloud is representative of the physical scene based at least in part on the spectral data collected from the at least four fields of view.

2. The system of claim 1, wherein at least half a number of the cameras in the camera array are configured to take an image containing spectral data of at least a portion of the physical scene at the same time.

3. The system of claim 1, wherein the at least four cameras in the camera array are configured to take simultaneous frames consisting of between 2 to 16 images within a static time period between 0.01 seconds and 1 second.

4. The system of claim 1, wherein the at least four cameras in the camera array are configured to take multiple simultaneous frames within a static time period between 0.01 seconds and 1 second.

5. The system of claim 1, wherein calculation of the one or more probabilities uses any one of median, trimmed mean or geometric median across pixels associated with at least the first spectral data and the second spectral data, the pixels being mapped to the one or more voxels.

6. The system of claim 1, wherein calculation of the one or more probabilities for a particular voxel of the one or more voxels further utilises information from one or more neighboring voxels, wherein the information indicates that the one or more neighboring voxels is occluded, transparent, or intersects a surface.

7. The system of claim 1, wherein calculation of the one or more probabilities uses a combination of spectral and spatial measures.

8. The system of claim 1, wherein calculation of the one or more probabilities includes information from neighbouring voxels to assist in the calculation particularly marking voxels behind a target voxel as occluded as viewed from either one or more cameras or one or more directions, and marking voxels in front of the target voxel as transparent as viewed from either one or more cameras or one or more directions.

9. The system of claim 1, wherein the plurality of cameras is configured to collect spectral data in one or more of the following: visual spectrum, infrared spectrum, and ultra violet spectrum.

10. The system of claim 1, wherein the plurality of cameras is configured to collect spectral data in a visual spectrum.

11. The system of claim 1, wherein the plurality of cameras is configured to collect spectral data in an infrared spectrum.

12. The system of claim 1, wherein the processing engine is configured to aggregate a portion of the scene represented by the one or more voxels occupied by the surface into a plurality of scenes to generate a voxel space formed by the plurality of voxels.

13. The system of claim 1, wherein one or more spectral signals in the spectral data includes one or more transparency values.

14. The system of claim 1, wherein one or more spectral signals in the spectral data includes one or more apparent image motion values.

15. The system of claim 1, wherein spectrum sensitivity of at least one of the plurality of cameras is different to spectrum sensitivity of the remaining plurality of cameras.

16. The system of claim 1, wherein the plurality of cameras in the camera array have a planar alignment.

17. The system of claim 1, wherein the plurality of cameras in the camera array have a non-planar alignment.

18. The system of claim 1, wherein the processing engine is further configured to calculate a voxel occupancy using a method comprising:
   (a) back-projection of one or more voxel faces to aligned collected spectral data in a 2D sensor space of the one or more cameras in the plurality of cameras;
   (b) calculating an agreement of a spectral response of a back-projection of one or more voxels across two or more of the collected spectral data; and
   (c) determining a probability based on the calculation of the agreement that a particular voxel of the one or more voxels at a particular depth in the scene is occupied by a solid object.

19. The system of claim 18, wherein the calculation of voxel occupancy further comprises:
   (a) reverse-projection from at least one voxel face into at least one normalized collected spectral data;
   (b) comparison of the spectral data in at least one reverse-projection;
   (c) analysis of spectral variability across at least one camera for the reverse-projection;
   (d) probability assessment, based on the spectral variability across the reverse-projections, of a likelihood that the spectral data emanated from at least one voxel at a depth of at least one source voxel face; and
   (e) assignment of a depth probability to the at least one source voxel that specifies the probability that it is occupied by a physical surface at the depth.

20. The system of claim 1, wherein the processing engine is configured to adjust a size of the voxel in order to alter the one or more calculated probabilities by any one or more of: increasing or decreasing voxel width, increasing or decreasing voxel height, and increasing or decreasing voxel depth.

* * * * *